(12) United States Patent
Sasaki et al.

(10) Patent No.: US 8,786,615 B2
(45) Date of Patent: Jul. 22, 2014

(54) IMAGE PROCESSOR INCLUDING RECONFIGURABLE INPUT AND OUTPUT DOMAIN SELECTORS

(75) Inventors: Gen Sasaki, Osaka (JP); Munehiro Mori, Mountain View, CA (US)

(73) Assignee: MegaChips Corporation, Osaka-shi (JP)

(*) Notice: Subject to any disclaimer, the term of this patent is extended or adjusted under 35 U.S.C. 154(b) by 199 days.

(21) Appl. No.: 13/239,601

(22) Filed: Sep. 22, 2011

(65) Prior Publication Data

US 2012/0081372 A1  Apr. 5, 2012

(30) Foreign Application Priority Data

Sep. 30, 2010  (JP) ................. 2010-222815

(51) Int. Cl.
*G06T 1/20* (2006.01)
(52) U.S. Cl.
USPC .......................... 345/502; 345/501; 345/506
(58) Field of Classification Search
None
See application file for complete search history.

(56) References Cited

U.S. PATENT DOCUMENTS

| | | | |
|---|---|---|---|
| 2003/0097068 A1* | 5/2003 | Hossack et al. | 600/443 |
| 2005/0253857 A1* | 11/2005 | Hutchins et al. | 345/506 |
| 2006/0050084 A1* | 3/2006 | Jeffrey et al. | 345/617 |
| 2007/0247532 A1* | 10/2007 | Sasaki | 348/231.99 |
| 2008/0030597 A1* | 2/2008 | Olsen et al. | 348/227.1 |

FOREIGN PATENT DOCUMENTS

| | | |
|---|---|---|
| JP | 63-316167 | 12/1988 |
| JP | 7-105357 | 4/1995 |
| JP | 8-63452 | 3/1996 |
| JP | 10-198798 | 7/1998 |
| JP | 2000-236473 | 8/2000 |
| JP | 2004-538583 | 12/2004 |
| JP | 2007-293431 | 11/2007 |
| JP | 2008-310649 | 12/2008 |
| WO | WO 2009/035774 A1 | 3/2009 |

OTHER PUBLICATIONS

Extended Search Report issued May 31, 2012 in European Patent Application No. 11183043.6-2218.
Jason C. Chen, et al., "CRISP: Coarse-Grained Reconfigurable Image Stream Processor for Digital Still Cameras and Camcorders", IEEE Transactions on Circuits and Systems for Video Technology, XP 011231979, vol. 18, No. 9, Sep. 2008, pp. 1223-1236.

(Continued)

*Primary Examiner* — David Zarka
*Assistant Examiner* — Jason Pringle-Parker
(74) *Attorney, Agent, or Firm* — Oblon, Spivak, McClelland, Maier & Neustadt, L.L.P.

(57) ABSTRACT

An image processing unit includes a computing unit, a data input unit that inputs image data to the computing unit, a data output unit that outputs the image data computed by the computing unit, and a setting unit. The computing unit includes computing cells including multiple types of computing cells, input domain selectors, and at least one of output domain selectors. The setting unit sets the input domain selectors and the output domain selectors so that image data inputted by the data input unit to the computing unit on which desired computing has been performed by at least one computing cell among the computing cells is outputted from the data output unit.

20 Claims, 34 Drawing Sheets

(56) References Cited

OTHER PUBLICATIONS

Hartej Singh, et al., "MorphoSys: An Integrated Reconfigurable System for Data-Parallel and Computation-Intensive Applications", IEEE Transactions on Computers, XP 002371128, vol. 49, No. 5, May 2000, pp. 465-474.

Marco Lanuzza, et al., "A New Reconfigurable Coarse-Grain Architecture for Multimedia Applications", Adaptive Hardware and Systems, AHS2007, XP031128137, Aug. 1, 2007, pp. 119-126.

Japanese Office Action issued Feb. 7, 2014 in corresponding Japanese Patent Application No. 2010-222815 (with English Translation), (6 pages).

* cited by examiner

30

IMAGE PROCESSOR INCLUDING RECONFIGURABLE INPUT AND OUTPUT DOMAIN SELECTORS

CROSS-REFERENCE TO RELATED APPLICATIONS

This application claims priority to Japanese Patent Application No. 2010-222815. The entire disclosure of Japanese Patent Application No. 2010-222815 is hereby incorporated herein by reference.

BACKGROUND OF THE INVENTION

1. Field of the Invention

The present invention relates to an image processor.

2. Description of the Background Art

JP2000-236473A discloses an image processor that performs image processing with a real-time processing unit and a CPU. The real-time processing unit includes multiple processing units that perform different image processing on image data, and performs real-time image processing (general image processing) on image data received from the imaging element. The image data processed by the real-time processing unit is stored in a memory. The CPU performs image processing other than the general image processing (exceptional image processing) on the image data stored in the memory, by means of software processing.

The real-time processing unit of the image processor disclosed in JP2000-236473A includes multiple processing units, each of the processing units having multiple computing cells connected in a predetermined order in accordance with processing. The image processor disclosed in JP2000-236473A has a disadvantage that it does not allow free setting of the relation of connection of the computing cells within each of the processing units, allowing each of the processing units to perform preset processing only.

Moreover, the processing units of the image processor disclosed in JP2000-236473A are connected in a preset order so as to realize a specific flow of processes of the general image processing. Thus changing the order of processing by the processing units requires a loop between the real-time processing unit and the memory to store in the memory image data processed by one of the processing units that performs certain processing and read from the memory target image data of another one of the processing units that performs a subsequent processing. Therefore, when severe change in the order of processing is desired, the number of times that the loop is repeated increases, which causes a problem that time required for processing is increased.

SUMMARY OF THE INVENTION

It is an object of the present invention to provide an image processor that achieves flexible setting of types and orders of processing of image data, and prevents increase in the time required even when types and orders of processing are changed.

An image processor according to an aspect of the present invention includes a computing unit that performs computing of image data, a data input unit that inputs the image data to the computing unit, a data output unit that outputs the image data computed by the computing unit, and a setting unit. The computing unit includes computing cells including multiple types of computing cells, input domain selectors, and at least one output domain selector. Input of each of the input domain selectors is connected to output of each of the computing cells and output of the data input unit, output of each of the input domain selectors is connected to input of the respective computing cells, input of the output domain selector is connected to output of each of the computing cells, and output of the output domain selector is connected to input of the data output unit. The setting unit sets the input domain selectors and the output domain selector so that image data inputted by the data input unit to the computing unit on which desired computing has been performed by at least one desired computing cell among the computing cells is outputted from the data output unit.

The computing unit includes computing cells including the multiple types of computing cells, the input domain selectors, and the at least one output domain selector. Then the setting unit sets the input domain selectors and the output domain selector so that image data inputted by the data input unit to the computing unit on which desired computing has been performed by the at least one desired computing cells among the computing cells is outputted from the data output unit. Therefore, a circuit that realizes the intended processing is configured by setting the input domain selectors and the output domain selector in accordance with the intended processing, which achieves flexible setting of types and orders of processing of image data. Even when types and orders of processing are changed, one-pass processing is feasible as long as there are sufficient functions of the computing cells, and thus a loop between the image processing unit and the memory unit is avoidable. This prevents increase in the time required. When one-pass processing is not possible, the intended processing can be still realized by loops, and also in such a case, the number of loops is reduced significantly, and thus increase in the time required is prevented.

Preferably, each of the computing cells includes input terminals and input channel selectors. Output of each of the input channel selectors is connected to the respective input terminals, and each input of the input channel selectors is connected to output of one of the input domain selectors. The setting unit sets the input channel selectors so that image data of a desired channel is selected from image data of multiple channels inputted by one of the input domain selectors to each of the input channel selectors, and the selected image data is inputted to the respective input terminals.

Each computing cell includes the input terminals and the input channel selectors. The setting unit sets the input channel selectors so that image data of a desired channel is selected from the image data of multiple channels inputted by one of the input domain selectors to each of the input channel selectors, and the selected image data is inputted to the input terminals. Such a configuration that allows the input channel selectors to select a channel achieves flexible setting of types and orders of processing of image data.

Preferably, the computing unit further includes at least one output channel selector. Input of the output channel selector is connected to output of the output domain selector, and output of the output channel selector is connected to input of the data output unit. The setting unit sets the output channel selector so that image data of a desired channel is selected from image data of multiple channels inputted by the output domain selector to the output channel selector, and the image data is inputted to the data output unit.

The computing unit includes at least one output channel selector. The setting unit sets the output channel selectors so that image data of a desired channel is selected from image data of multiple channels inputted by the output domain selector to the output channel selector, and the selected image data is inputted to the data output unit. Such a configuration that allows the output channel selector to select a channel achieves flexible setting of types and orders of processing of image data.

Preferably, the computing cells include an integration cell that integrates image data outputted from at least two of the computing cells.

Having such an integration cell within the computing unit achieves flexible setting of types and orders of processing of image data.

Preferably, the computing cells include a delay cell that allows a delay amount to be set.

Having such a delay cell that allows a delay amount to be set within the computing unit achieves flexible setting of types and orders of processing of image data.

Preferably, the computing cells include delay cells that differ in delay amounts.

Having such delay cells that differ in delay amounts within the computing unit achieves flexible setting of types and orders of processing of image data.

Preferably, the computing cells include a spatial filtering cell that allows the number of taps to be set.

Having such a spatial filtering cell that allows the number of taps to be set within the computing unit achieves flexible setting of types and orders of processing of image data.

Preferably, the number of taps of the spatial filtering cell is set at either one of a first value and a second value smaller than the first value, and the spatial filtering cell is used independently as multiple spatial filters, when the number of taps of the spatial filtering cell is set at the second value.

This achieves effective use of the spatial filtering cell, and also achieves flexible setting of types and orders of processing of image data.

Preferably, the spatial filtering cell includes a spatial filter that allows a coefficient to be set and a spatial filter with a fixed coefficient.

Having the spatial filter that allows a coefficient to be set achieves flexible setting of types and orders of processing of image data. Having the spatial filter with a fixed coefficient avoids increase in circuit size compared with a case where all the spatial filters allow a coefficient to be set.

Preferably, the computing cells include a matrix computing cell that allows an order to be set.

Having such a matrix computing cell that allows an order to be set within the computing unit achieves flexible setting of types and orders of processing of image data.

Preferably, the computing cells include a multifunction cell that performs multiple types of computing.

Having such a multifunction cell that performs multiple types of computing within the computing unit achieves flexible setting of types and orders of processing of image data.

Preferably, at least one of the computing cells receives input of image data of multiple channels and allows setting to perform desired computing on image data of a first channel for output, while outputting image data of a second channel without performing desired computing.

Having such a path where image data of the second channel is outputted without computing achieves flexible setting of types and orders of processing of image data.

Preferably, the computing cell delays output of image data of the second channel by a delay amount equivalent of time required for desired computing on image data of the first channel.

This enables the computing cell to output image data of the first channel on which computing is performed and image data of the second channel on which computing is not performed at the same time.

Preferably, the computing cell allows setting to output image data of the first channel without performing desired computing.

Having such a path where image data of the first channel is outputted without computing achieves flexible setting of types and orders of processing of image data.

Preferably, the computing unit further includes an accumulator cell as one of the computing cells that outputs no image data.

Having such an accumulator cell within the computing unit achieves flexible setting of types and orders of processing of image data.

Preferably, the computing unit further includes a histogram cell as one of the computing cells that outputs no image data.

Having such a histogram cell within the computing unit achieves flexible setting of types and orders of processing of image data.

Preferably, the data input unit inputs image data received from a memory unit to the computing unit.

This enables the computing unit to perform desired computing on the image data received from the memory unit.

Preferably, the data input unit inputs image data received from an imaging element to the computing unit.

This enables the computing unit to perform desired computing on the image data received from the imaging element.

Preferably, the data input unit selects either one of image data received from a memory unit and image data received from an imaging element to input to the computing unit.

This enables the computing unit to perform desired computing on the image data received from the memory unit or the image data received from the imaging element.

Preferably, the data output unit outputs image data computed by the computing unit to a memory unit.

This realizes storing of the image data computed by the computing unit in the memory unit.

Preferably, the data output unit outputs image data computed by the computing unit to a display unit.

This realizes displaying an image based on the image data computed by the computing unit with the display unit.

Preferably, the data output unit outputs image data computed by the computing unit to a memory unit and a display unit.

This realizes storing of the image data computed by the computing unit in the memory unit and also displaying an image based on the image data computed by the computing unit with the display unit.

The present invention realizes an image processor that achieves flexible setting of types and orders of processing of image data, and prevents increase in the time required even when types and orders of processing are changed.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
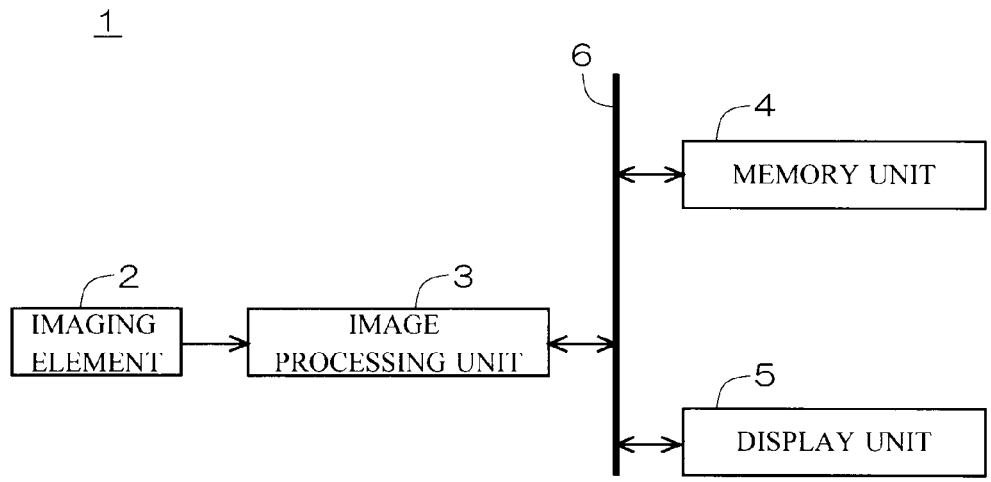
FIG. 1 is a block diagram schematically illustrating a configuration of an imaging device according to an embodiment of the present invention.

Preferred embodiments of the present invention are described in detail below referring to the drawings. It should be noted that identical reference numerals throughout the drawings indicate identical or equivalent elements.

FIG. 1 is a block diagram schematically illustrating a configuration of an imaging device 1 according to an embodiment of the present invention. As illustrated in FIG. 1, the imaging device 1 includes an imaging element 2 such as a CCD, an image processing unit 3 as an image processor, a memory unit 4 such as a semiconductor memory, a display unit 5 such as a liquid crystal display, and a bus 6. The image processing unit 3 is connected to the imaging element 2. The image processing unit 3 is also connected to the memory unit 4 and the display unit 5 via the bus 6.

Figure 2:
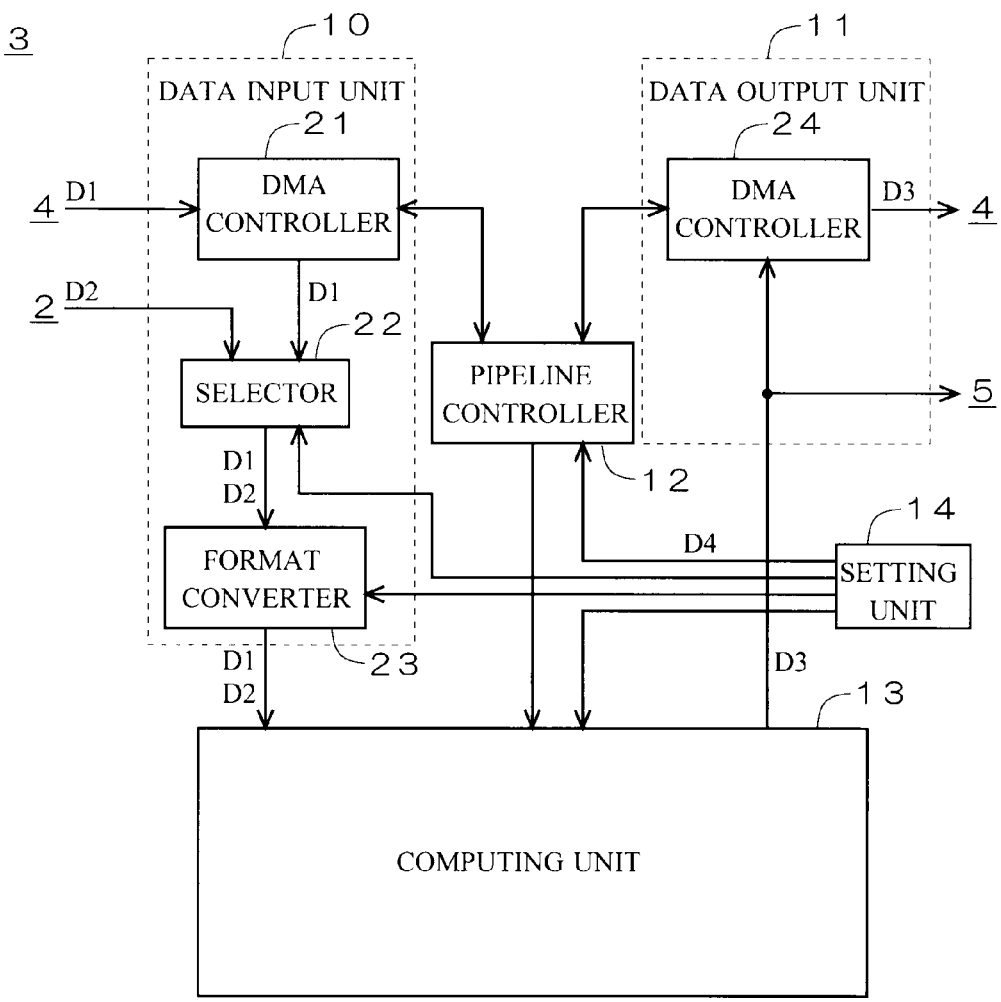
FIG. 2 is a block diagram illustrating a configuration of an image processing unit.

FIG. 2 is a block diagram illustrating a configuration of the image processing unit 3. As illustrated in FIG. 2, the image processing unit 3 includes a data input unit 10, a data output unit 11, a pipeline controller 12, a computing unit 13 and a setting unit 14. The data input unit 10 includes a DMA (Direct Memory Access) controller 21, a selector 22, and a format converter 23. The data output unit 11 includes a DMA controller 24.

The data input unit 10 inputs image data D1 received from the memory unit 4 to the computing unit 13. The data input unit 10 also inputs image data D2 received from the imaging element 2 to the computing unit 13. More specifically, the image data D1 is received by the selector 22 from the memory unit 4 via the bus 6 and the DMA controller 21, and the image data D2 is received by the selector 22 from the imaging element 2. The selector 22 selects either one of the image data D1 and the image data D2, based on a control signal D4 received from the setting unit 14. Then the selector 22 inputs the selected one of the image data D1 and image data D2 to the format converter 23. The format converter 23 converts the data format of the image data D1 or D2 received from the selector 22 into a predetermined data format, and inputs the converted image data D1 or D2 to the computing unit 13. The format converter 23 converts, for example, the image data D1 or D2 in YUV422 format into the image data D1 or D2 in YUV444 format, and inputs the converted image data D1 or D2 to the computing unit 13.

The pipeline controller 12 controls pipelining in the computing unit 13 by handshaking with the DMA controllers 21 and 24.

The computing unit 13 performs below-described desired computing on the image data D1 or D2 received from the data input unit 10.

The data output unit 11 outputs image data D3 computed by the computing unit 13 to the memory unit 4 and the display unit 5. More specifically, the image data D3 is inputted by the computing unit 13 to the DMA controller 24, and outputted from the DMA controller 24 via the bus 6 to the memory unit 4. The image data D3 is also outputted from the computing unit 13 via the bus 6 to the display unit 5.

The setting unit 14 includes a control register or the like, and outputs the control signal D4 to control the pipeline controller 12, the format converter 23, the computing unit 13, and the selector 22. The control signal D4 is inputted to the pipeline controller 12, the format converter 23, the computing unit 13, and the selector 22.

Figure 3:
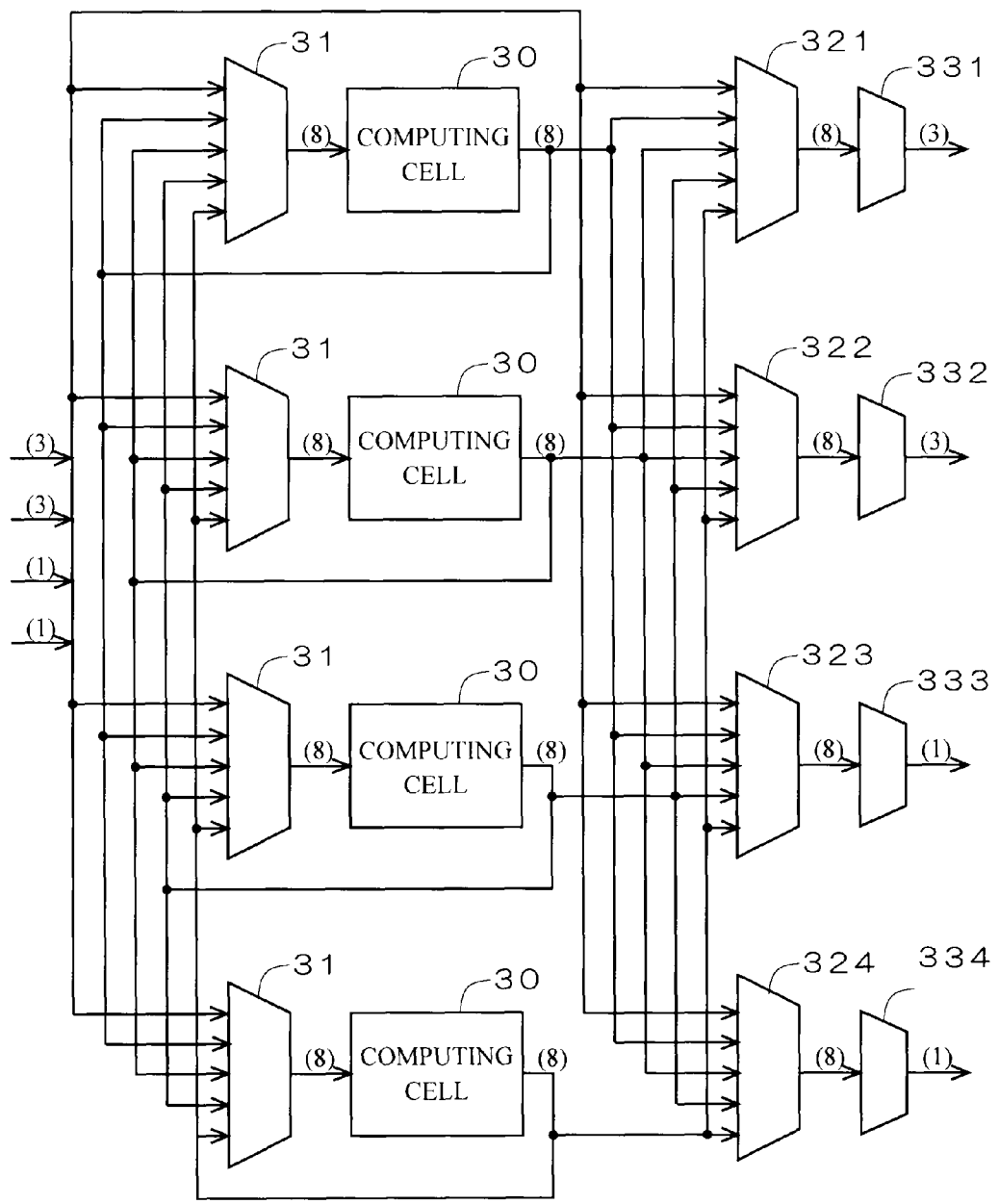
FIG. 3 is a circuit diagram schematically illustrating a configuration of a computing unit.

FIG. 3 is a circuit diagram schematically illustrating a configuration of the computing unit 13. The computing unit 13 includes computing cells (four computing cells 30 in the example of FIG. 3), input domain selectors (four input domain selectors 31 in the example of FIG. 3), at least one output domain selector (four output domain selectors 321 to 324 in the example of FIG. 3), and at least one output channel selector (four output channel selectors 331 to 334 in the example of FIG. 3). The input domain selectors 31 are paired up with the computing cells 30. The output channel selectors 331 to 334 are paired up with the output domain selectors 321 to 324.

In an example of the present embodiment, image data processed by the computing unit 13 is configured as data having a total of eight channels, with a domain having eight channels as a unit, the eight channels including a first image channel of three channels, a second image channel of three channels, a first alpha channel of one channel, and a second alpha channel of one channel. The output domain selector 321 and the output channel selector 331 correspond to the first image channel, the output domain selector 322 and the output channel selector 332 correspond to the second image channel, the output domain selector 323 and the output channel selector 333 correspond to the first alpha channel, and the output domain selector 324 and the output channel selector 334 correspond to the second alpha channel. In FIG. 3, the numbers in parentheses indicate the number of channels.

Input of each of the input domain selectors 31 is connected to output of each of the computing cells 30 and output of the data input unit 10. Output of each of the input domain selectors 31 is connected to input of the respective computing cells 30. Input of each of the output domain selectors 321 to 324 is connected to output of the data input unit 10 and output of each of the computing cells 30. Output of each of the output domain selectors 321 to 324 is connected to input of the data output unit 11 via the respective output channel selectors 331 to 334.

As described below, the computing cells 30 include multiple types of computing cells that perform different types of computing. With the image processing unit 3 according to the present embodiment, selection of input terminals of each of the input domain selectors 31 and selection of input terminals of each of the output domain selectors 321 to 324 are set by the setting unit 14, so that the image data inputted by the data input unit 10 to the computing unit 13 on which desired computing has been performed by one or more desired computing cells among the computing cells 30 is outputted from the data output unit 11.

Input of each of the output channel selectors 331 to 334 is connected to output of the respective output domain selectors 321 to 324. Output of each of the output channel selectors 331 to 334 is connected to input of the data output unit 11. With the image processing unit 3 according to the present embodiment, selection of input terminals of each of the output channel selectors 331 to 334 is set by the setting unit 14, so that image data of a desired channel is selected from image data of multiple channels (eight channels in this example) inputted by each of the output domain selectors 321 to 324 to the respective output channel selectors 331 to 334, and the selected image data is inputted to the data output unit 11. More specifically, the output channel selectors 331 and 332 each selects image data of three desired channels from the image data of eight channels inputted respectively from the output domain selectors 321 and 322. The output channel selectors 333 and 334 each selects image data of one desired channel from the image data of eight channels respectively received from the output domain selectors 323 and 324.

Figure 4:
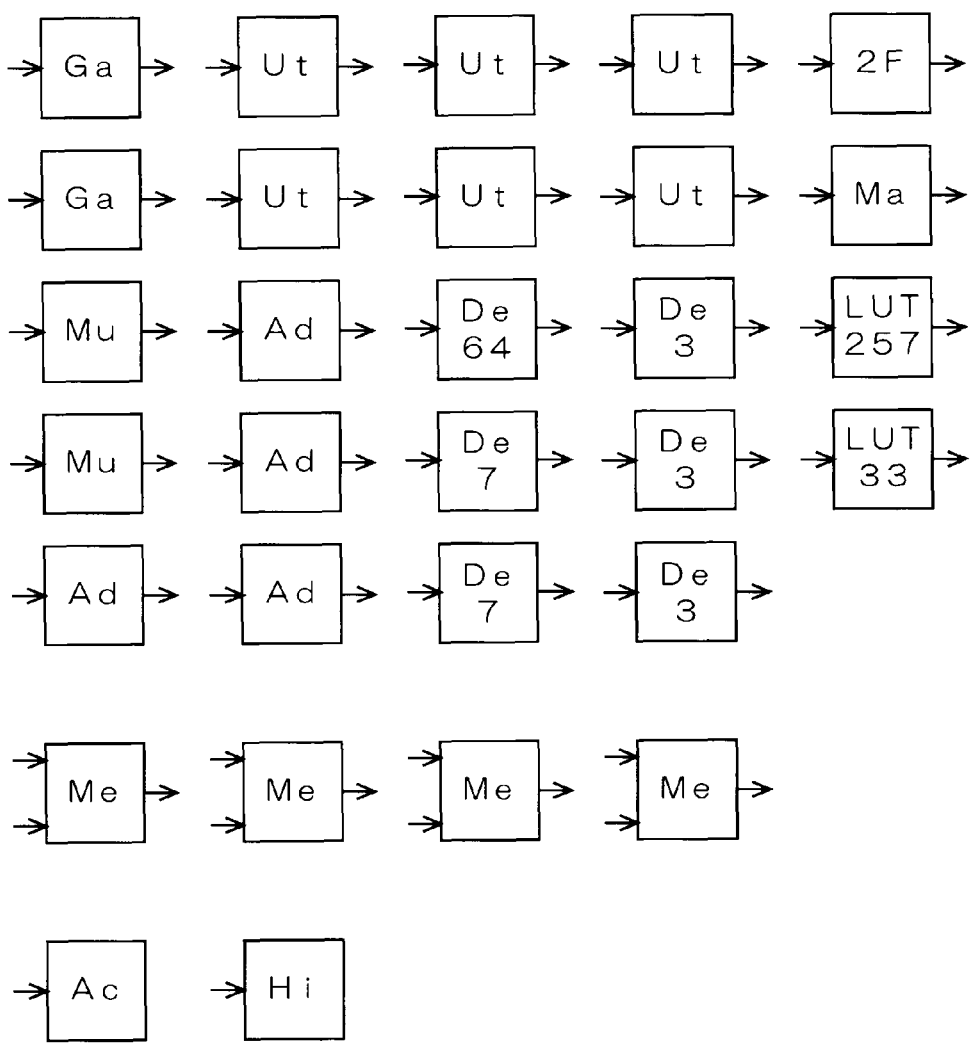
FIG. 4 is a diagram illustrating types of computing cells of the computing unit.

FIG. 4 is a diagram illustrating types of the computing cells 30 of the computing unit 13. As illustrated in FIG. 4, in the example of the present embodiment, computing cells having input of one domain and output of one domain, including two gain cells Ga, six utility cells Ut (hereinafter, "multifunction cell"), one spatial filtering cell 2F, one matrix computing cell Ma, four addition cells Ad, two multiplication cells Mu, one delay cell De 64 that allows delay amount up to 64 clock cycles, two delay cells De7 that allow delay amount up to seven clock cycles, three delay cells De3 that allow delay amount up to three clock cycles, one look-up table cell LUT257 employing piecewise linear approximation with 256 broken lines (257 breakpoints), and one look-up table cell LUT33 employing piecewise linear approximation with 32 broken lines (33 breakpoints), are provided. Computing cells having input of two domains (alternatively, of 3 or more domains) and output of one domain, including four merger cells Me (hereinafter, "integration cell"), are also provided. Moreover, computing cells having input of one domain and no output of any domain, including one accumulator cell and one histogram cell, are also provided.

Figure 5:
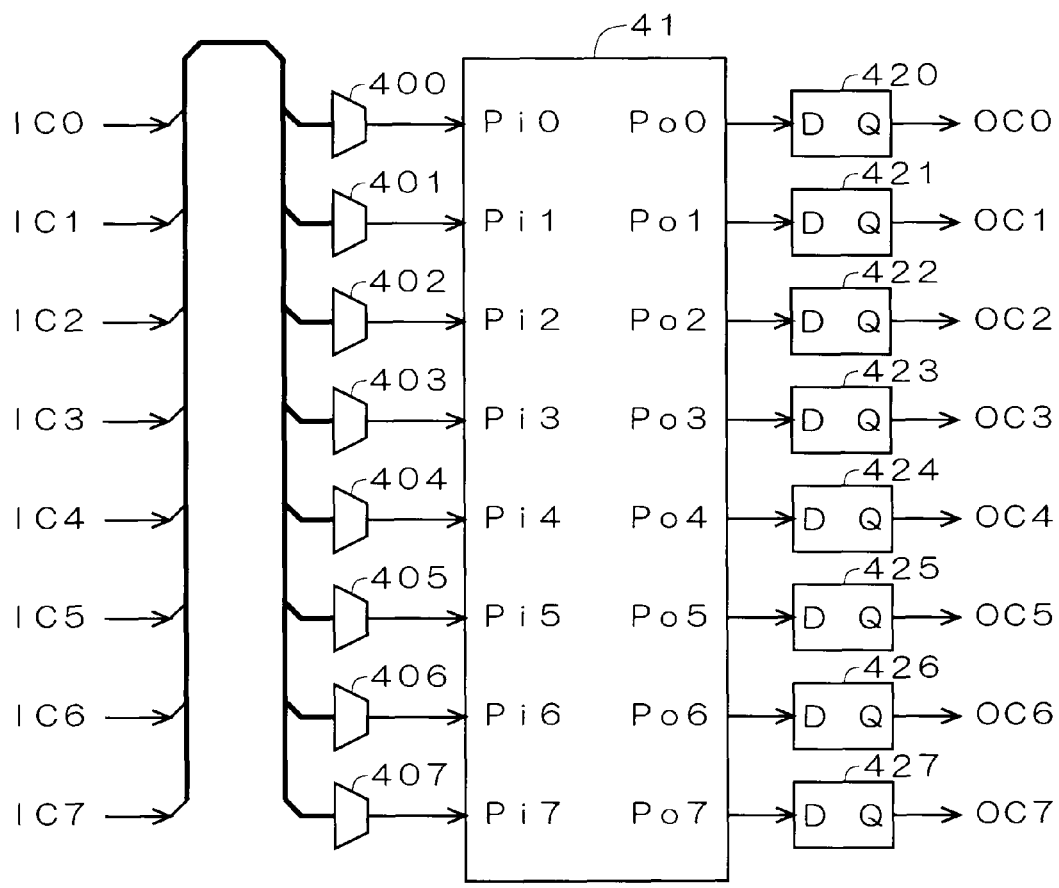
FIG. 5 is a diagram illustrating a configuration of one of the computing cells having input of one domain and output of one domain.

FIG. 5 is a diagram illustrating a configuration of one of the computing cells 30 having input of one domain and output of one domain. As illustrated in FIG. 5, the computing cell 30 includes a processing block 41 having eight input terminals Pi0 to Pi7 and eight output terminals Po0 to Po7, eight input channel selectors 400 to 407 respectively connected to the input terminals Pi0 to Pi7, and eight flip-flops 420 to 427 respectively connected to the output terminals Po0 to Po7. Input of the input channel selectors 400 to 407 is connected to output of the corresponding input domain selector 31. Output of each of the input channel selectors 400 to 407 is connected to the respective input terminals Pi0 to Pi7.

The computing cell 30 receives input of image data of eight channels IC0 to IC7 that is equivalent of one domain, from the corresponding input domain selector 31. The image data of the eight channels IC0 to IC7 is inputted to each of the input channel selectors 400 to 407. That is, the input channel selectors 400 to 407 each receive the image data of the eight channels IC0 to IC7. With the image processing unit 3 according to the present embodiment, selection of input terminals of each of the input channel selectors 400 to 407 is set by the setting unit 14, so that image data of a desired channel is selected from image data of the eight channels IC0 to IC7 inputted by the corresponding input domain selector 31 to each of the input channel selectors 400 to 407, and the selected image data is inputted to the respective input terminals Pi0 to Pi7. Image data of eight channels OC0 to OC7 is respectively outputted from the output terminals Po0 to Po7 via the flip-flops 420 to 427.

Figure 6:
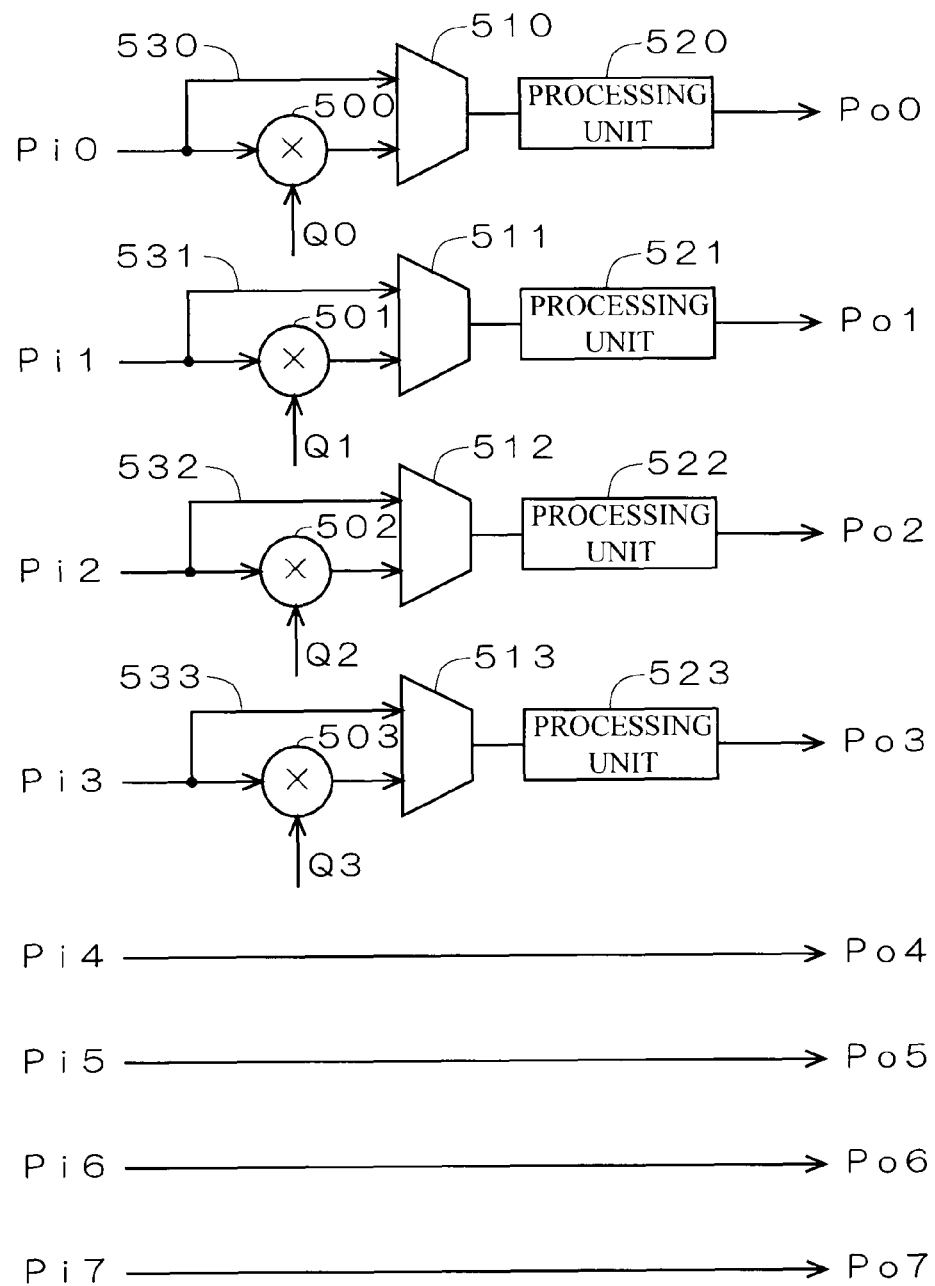
FIG. 6 is a circuit diagram illustrating a configuration of a processing block of a gain cell.

FIG. 6 is a circuit diagram illustrating a configuration of the processing block 41 of the gain cell Ga. A zero-th channel includes a multiplier 500, a selector 510, and a processing unit 520 connected between the input terminal Pi0 and the output terminal Po0. The multiplier 500 multiplies image data received from the input terminal Pi0 by a gain Q0 set by the setting unit 14, and input the multiplied image data to the selector 510. The processing unit 520 right-shifts the image data received from the selector 510 by a predetermined bit number set by the setting unit 14. The selector 510 is also connected to a path 530 that is connected from the input terminal Pi0 without the multiplier 500. The selector 510 selects either one of the input terminal connected to the path 530 and the input terminal connected to the multiplier 500, based on the setting by the setting unit 14.

Similarly, first to third channels include multipliers 501 to 503, selectors 511 to 513, and processing units 521 to 523 connected between the input terminals Pi1 to Pi3 and the output terminals Po1 to Po3, respectively. The multipliers 501 to 503 multiply image data received from the input terminals Pi1 to Pi3 by gains Q1 to Q3 set by the setting unit 14, and input the multiplied image data to the selectors 511 to 513, respectively. The processing units 521 to 523 right-shift the image data respectively received from the selectors 511 to 513 by a predetermined bit number set by the setting unit 14. The selectors 511 to 513 are also connected to paths 531 to 533 that are connected from the input terminals Pi1 to Pi3 without the multipliers 501 to 503, respectively. The selectors 511 to 513 respectively select either one of the input terminal connected to the paths 531 to 533 and the input terminal connected to the multipliers 501 to 503, based on the setting by the setting unit 14.

In contrast, fourth to seventh channels include no multiplier 500, no selector 510, and no processing unit 520 connected between the input terminals Pi4 to Pi7 and the output terminals Po4 to Po7, with the input terminals Pi4 to Pi7 directly connected to the output terminals Po4 to Po7, respectively. Thus the image data inputted to the input terminals Pi4 to Pi7 is respectively outputted from the output terminals Po4 to Po7, without being processed by any of the multiplier 500 and the processing unit 520.

Figure 7:
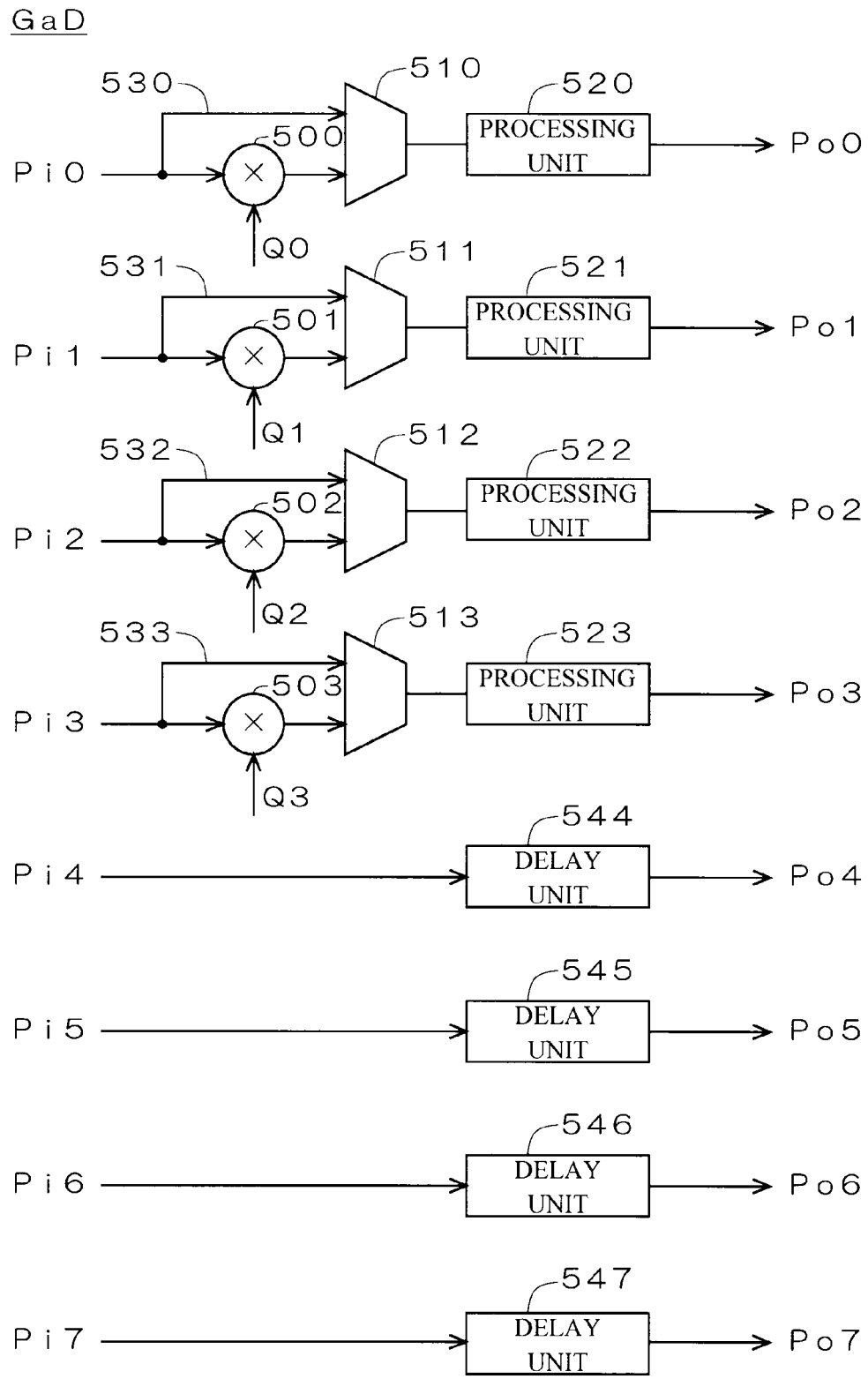
FIG. 7 is a circuit diagram illustrating a configuration of a processing block of a gain cell according to a modification.

FIG. 7 is a circuit diagram illustrating a configuration of the processing block 41 of a gain cell GaD according to a modification. The configurations of zero-th to third channels are the same as those illustrated in FIG. 6. Fourth to seventh channels include delay units 544 to 547 connected between the input terminals Pi4 to Pi7 and the output terminals Po4 to Po7, respectively. The delay units 544 to 547 delay output of the image data respectively inputted to the input terminals Pi4 to Pi7 by a delay amount equivalent of time required for the above processing in the zero-th to the third channels.

Figure 8:
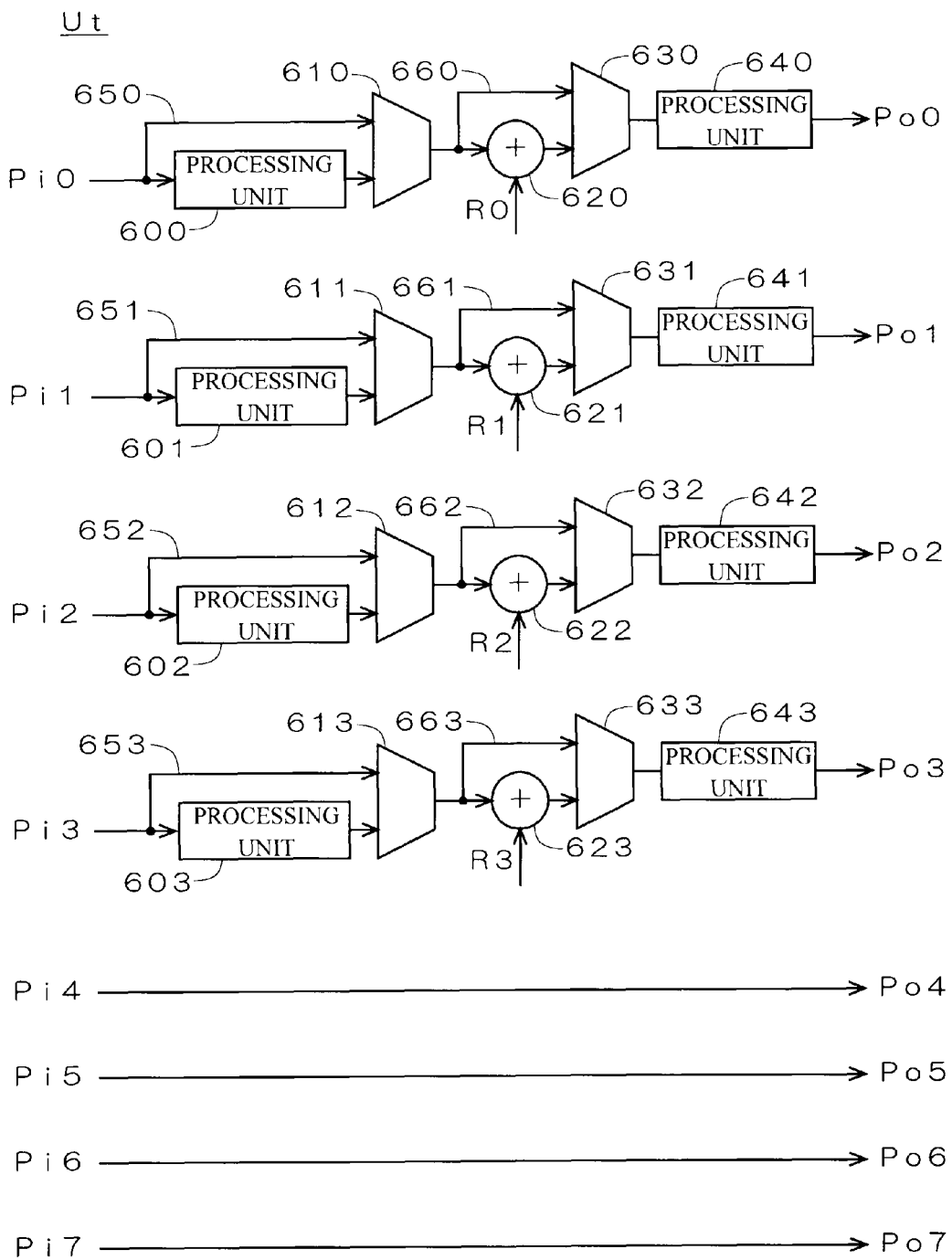
FIG. 8 is a circuit diagram illustrating a configuration of a processing block of a multifunction cell.

FIG. 8 is a circuit diagram illustrating a configuration of the processing block 41 of the multifunction cell Ut. A zero-th channel includes a processing unit 600, a selector 610, an adder 620 a selector 630, and a processing unit 640 connected between the input terminal Pi0 and the output terminal Po0. The processing unit 600 inverts a sign of the image data received from the input terminal Pi0, and inputs the image data with the inverted sign to the selector 610. The adder 620 adds an offset value R0 set by the setting unit 14 to the image data received from the selector 610, and input the image data after addition to the selector 630. The processing unit 640 left-shifts or right-shifts the image data received from the selector 630 by a predetermined bit number set by the setting unit 14. The processing unit 640 also functions as a limiter to limit the image data to a predetermined bit number set by the setting unit 14. Furthermore, the processing unit 640 has a function to output an absolute value of the image data. Arbitrary setting of processing by the processing unit 640 is achieved by the setting unit 14.

The selector 610 is connected to a path 650 that is connected from the input terminal Pi0 without the processing unit 600. The selector 610 selects either one of the input terminal connected to the path 650 and the input terminal connected to the processing unit 600, based on the setting by the setting unit 14. Similarly, the selector 630 is connected to a path 660 that is connected from output of the selector 610 without the adder 620. The selector 630 selects either one of the input terminal connected to the path 660 and the input terminal connected to the adder 620, based on the setting by the setting unit 14.

Similar to the zero-th terminal, first to third channels include processing units 601 to 603, selectors 611 to 613, adders 621 to 623, selectors 631 to 633, and processing units 641 to 643 connected between the input terminals Pi1 to Pi3 and the output terminals Po1 to Po3, respectively. The processing units 601 to 603 invert the sign of the image data inputted respectively from the input terminals Pi1 to Pi3, and input the image data with the inverted sign respectively to the selectors 611 to 613. The adders 621 to 623 add an offset values R1 to R3 set by the setting unit 14 to the image data received from the selectors 611 to 613, respectively, and input the image data after addition respectively to the selectors 631 to 633. The processing units 641 to 643 left-shift or right-shift the image data respectively received from the selectors 631 to 633 by a predetermined bit number set by the setting unit 14. The processing units 641 to 643 also function as a limiter to limit the image data to a predetermined bit number set by the setting unit 14. Furthermore, the processing units 641 to 643 have a function to output an absolute value of the image data. Arbitrary setting of processing by the processing units 641 to 643 is achieved by the setting unit 14.

The selectors 611 to 613 are also connected to paths 651 to 653 that are connected from the input terminals Pi1 to Pi3 without the processing units 601 to 603, respectively. The selectors 611 to 613 respectively select either one of the input terminal connected to the paths 651 to 653 and the input terminal connected to the processing units 601 to 603, based on the setting by the setting unit 14. Similarly, the selectors 631 to 633 are also connected to paths 661 to 663 that are connected from the output of the selectors 611 to 613 without the adders 621 to 623, respectively. The selectors 631 to 633 respectively select either one of the input terminal connected to the paths 661 to 663 and the input terminal connected to the adders 621 to 623, based on the setting by the setting unit 14.

In contrast, fourth to seventh channels include no processing unit 600, no selector 610, no adder 620, no selector 630, and no processing unit 640 connected between the input terminals Pi4 to Pi7 and the output terminals Po4 to Po7, with the input terminals Pi4 to Pi7 directly connected to the output terminals Po4 to Po7, respectively. Thus the image data inputted to the input terminals Pi4 to Pi7 is respectively outputted from the output terminals Po4 to Po7, without being processed by any of the processing unit 600, the adder 620, and the processing unit 640.

Figure 9:
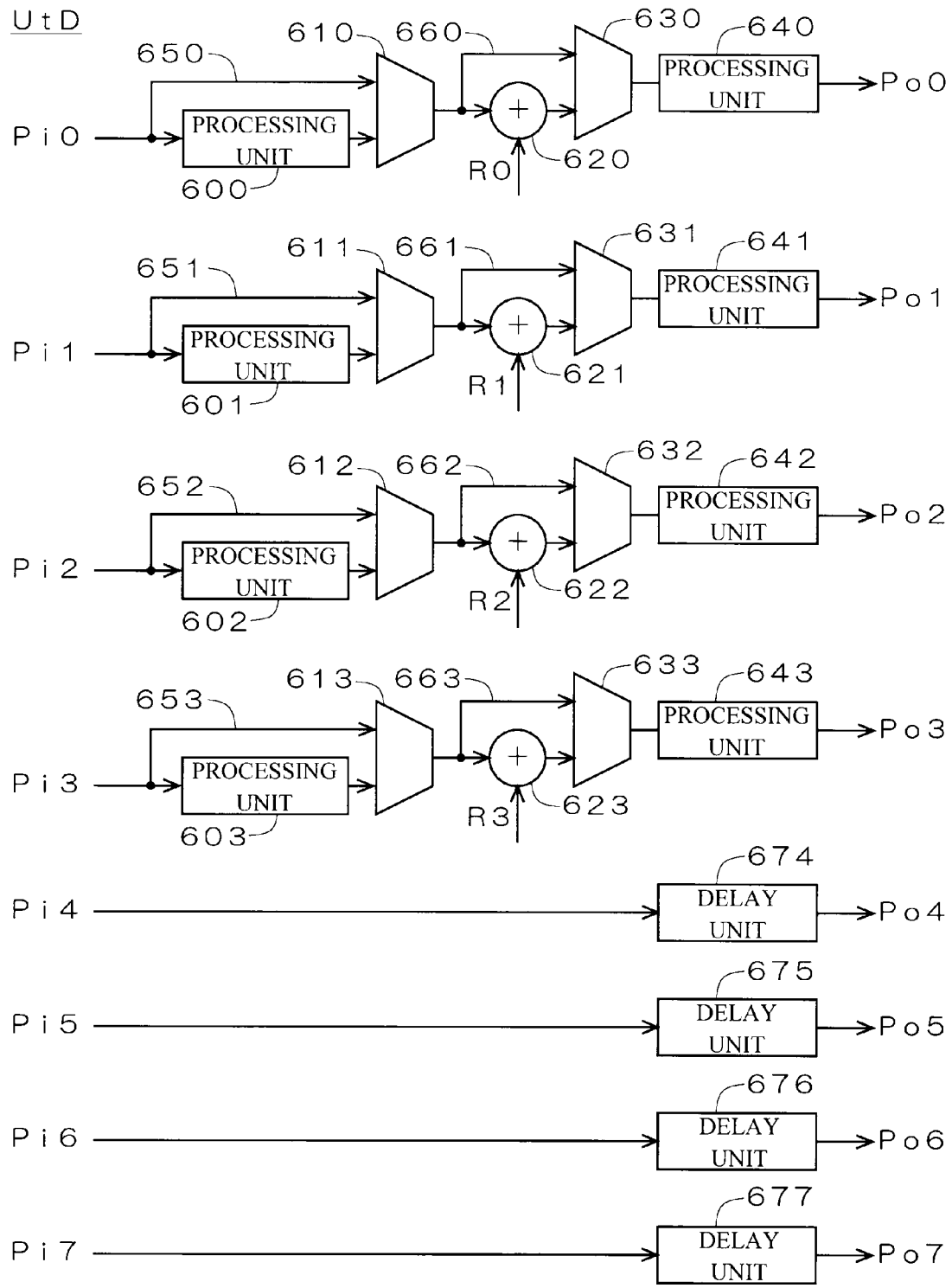
FIG. 9 is a circuit diagram illustrating a configuration of a processing block of a multifunction cell according to a modification.

FIG. 9 is a circuit diagram illustrating a configuration of the processing block 41 of a multifunction cell UtD according to a modification. The configurations of zero-th to third channels are the same as those illustrated in FIG. 8. Fourth to seventh channels include delay units 674 to 677 connected between the input terminals Pi4 to Pi7 and the output terminals Po4 to Po7, respectively. The delay units 674 to 677 delay output of the image data respectively inputted to the input terminals Pi4 to Pi7 by a delay amount equivalent of time required for the above processing in the zero-th to the third channels.

Figure 10:
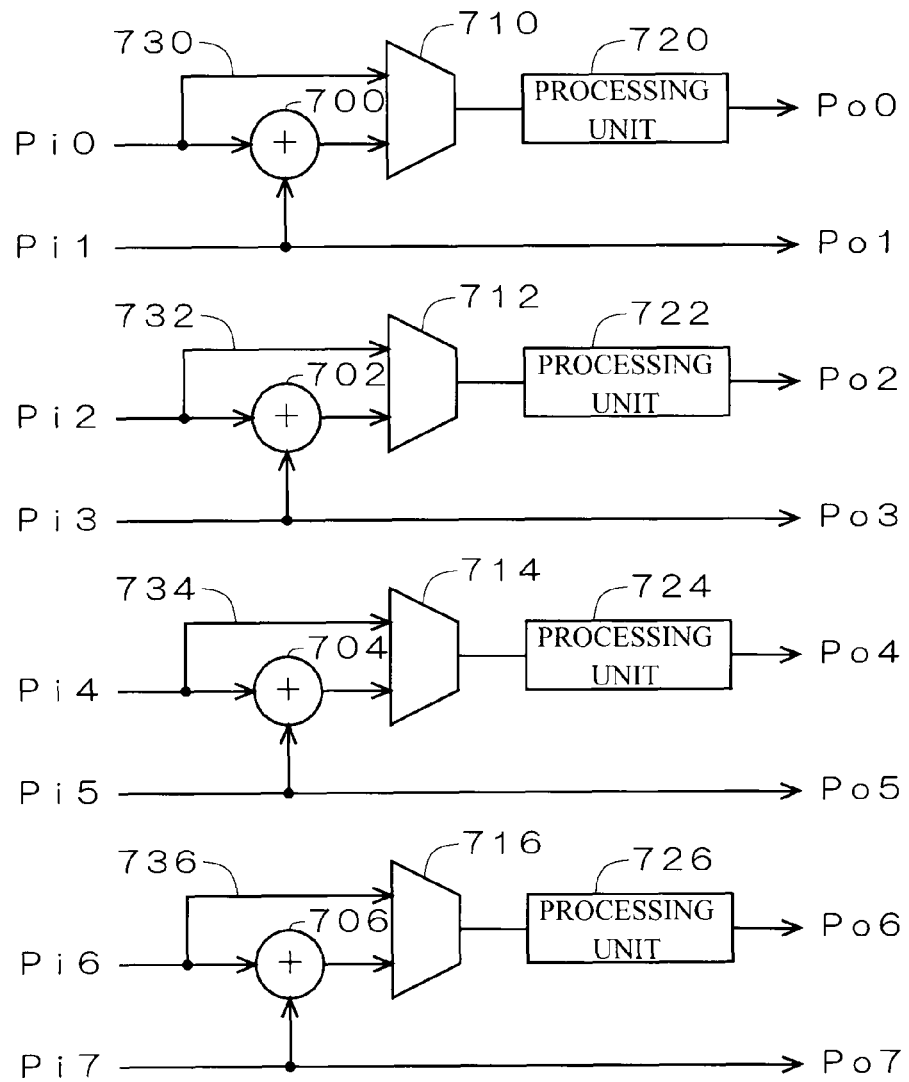
FIG. 10 is a circuit diagram illustrating a configuration of a processing block of an addition cell.

FIG. 10 is a circuit diagram illustrating a configuration of the processing block 41 of the addition cell Ad. A zero-th channel includes an adder 700, a selector 710, and a processing unit 720 connected between the input terminal Pi0 and the output terminal Po0. The input terminal of the adder 700 is connected to the input terminals Pi0 and Pi1. The adder 700 adds image data received from the input terminal Pi0 and image data received from the input terminal Pi1, and inputs the added image data to the selector 710. The processing unit 720 left-shifts or right-shifts the image data received from the selector 710 by a predetermined bit number set by the setting unit 14. The processing unit 720 also functions as a limiter to limit the image data to a predetermined bit number set by the setting unit 14. Arbitrary setting of processing by the processing unit 720 is achieved by the setting unit 14. The selector 710 is also connected to a path 730 that is connected from the input terminal Pi0 without the adder 700. The selector 710 selects either one of the input terminal connected to the path 730 and the input terminal connected to the adder 700, based on the setting by the setting unit 14.

Similarly, second, fourth, and sixth channels include adders 702, 704, and 706, selectors 712, 714, and 716, and processing units 722, 724, and 726 connected between the input terminals Pi2, Pi4, and Pi6 and the output terminals Po2, Po4, and Po6, respectively. The input terminals of the adders 702, 704, and 706 are connected to the input terminals Pi2 and Pi3, the input terminals Pi4 and Pi5, and the input terminals Pi6 and Pi7, respectively. The adders 702, 704, and 706 add image data received from the input terminals Pi2, Pi4, and Pi6 and image data received from the input terminals Pi3, Pi5, and Pi7, and input the added image data to the selectors 712, 714, and 716, respectively. The processing units 722, 724, and 726 left-shift or right-shift the image data respectively received from the selectors 712, 714, and 716 by a predetermined bit number set by the setting unit 14. The processing units 722, 724, and 726 also function as a limiter to limit the image data to a predetermined bit number set by the setting unit 14. Arbitrary setting of processing by the processing units 722, 724, and 726 is achieved by the setting unit 14. The selectors 712, 714, and 716 are also connected to paths 732, 734, and 736 that are connected from the input terminals Pi2, Pi4, and Pi6 without the adders 702, 704, and 706, respectively. The selectors 712, 714, and 716 respectively select either one of the input terminal connected to the paths 732, 734, and 736 and the input terminal connected to the adders 702, 704, and 706, based on the setting by the setting unit 14.

In contrast, first, third, fifth, and seventh channels include no adder 700, no selector 710, and no processing unit 720 connected between the input terminals Pi1, Pi3, Pi5, and Pi7 and the output terminals Po1, Po3, Po5, and Po7, with the input terminals Pi1, Pi3, Pi5, and Pi7 directly connected to the output terminals Po1, Po3, Po5, and Po7, respectively. Thus the image data inputted to the input terminals Pi1, Pi3, Pi5, and Pi7 is respectively outputted from the output terminals Po1, Po3, Po5, and Po7, without being processed by any of the adder 700 and the processing unit 720.

Figure 11:
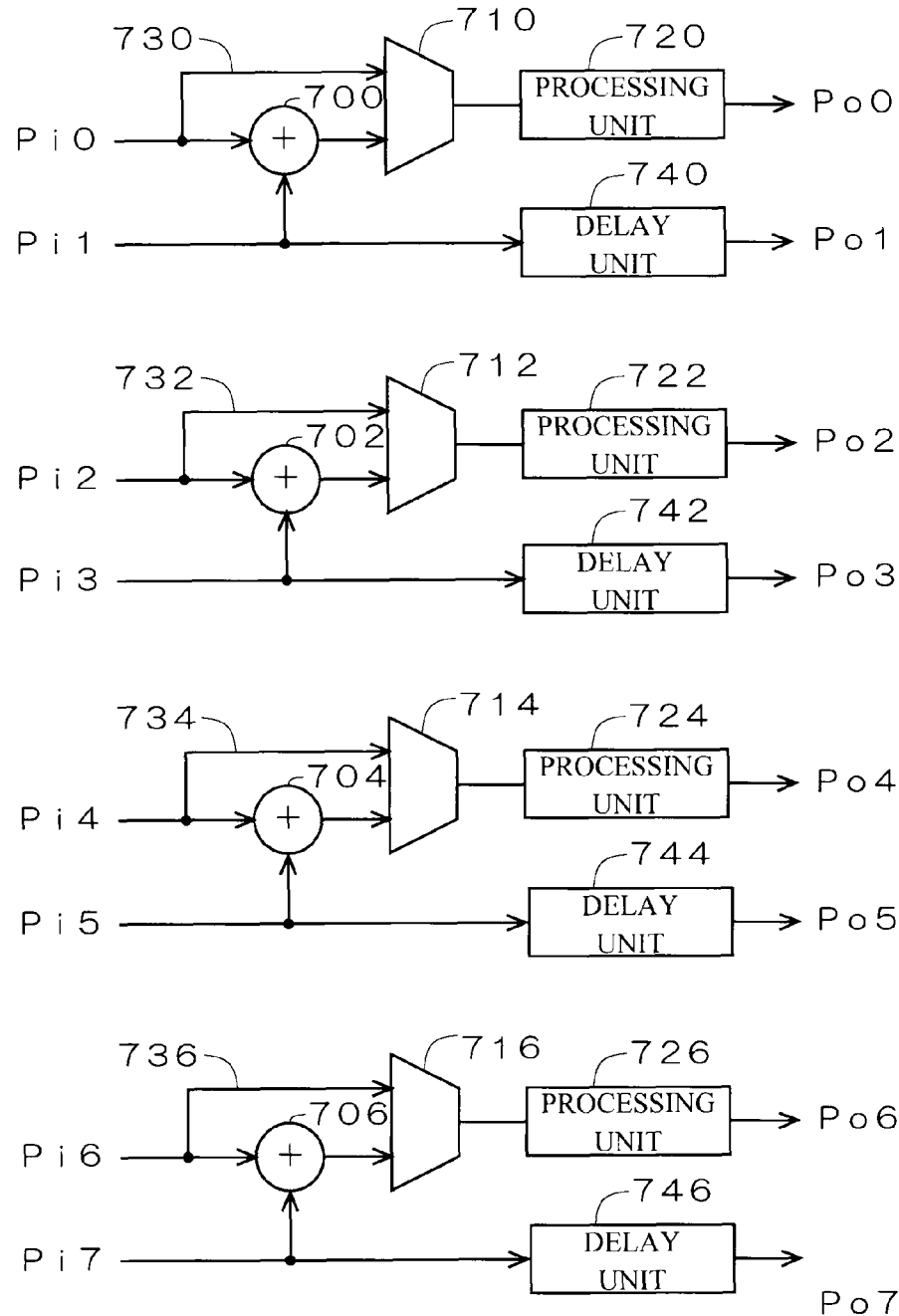
FIG. 11 is a circuit diagram illustrating a configuration of a processing block of an addition cell according to a modification.

FIG. 11 is a circuit diagram illustrating a configuration of the processing block 41 of an addition cell AdD according to a modification. The configurations of zero-th, second, fourth, and sixth channels are the same as those illustrated in FIG. 10. First, third, fifth, and seventh channels include delay units 740, 742, 744, and 746 connected between the input terminals Pi1, Pi3, Pi5, and Pi7 and the output terminals Po1, Po3, Po5, and Po7, respectively. The delay units 740, 742, 744, and 746 delay output of the image data respectively inputted to the input terminals Pi1, Pi3, Pi5, and Pi7 by a delay amount equivalent of time required for the above processing in the zero-th, the second, the fourth, and the sixth channels.

Figure 12:
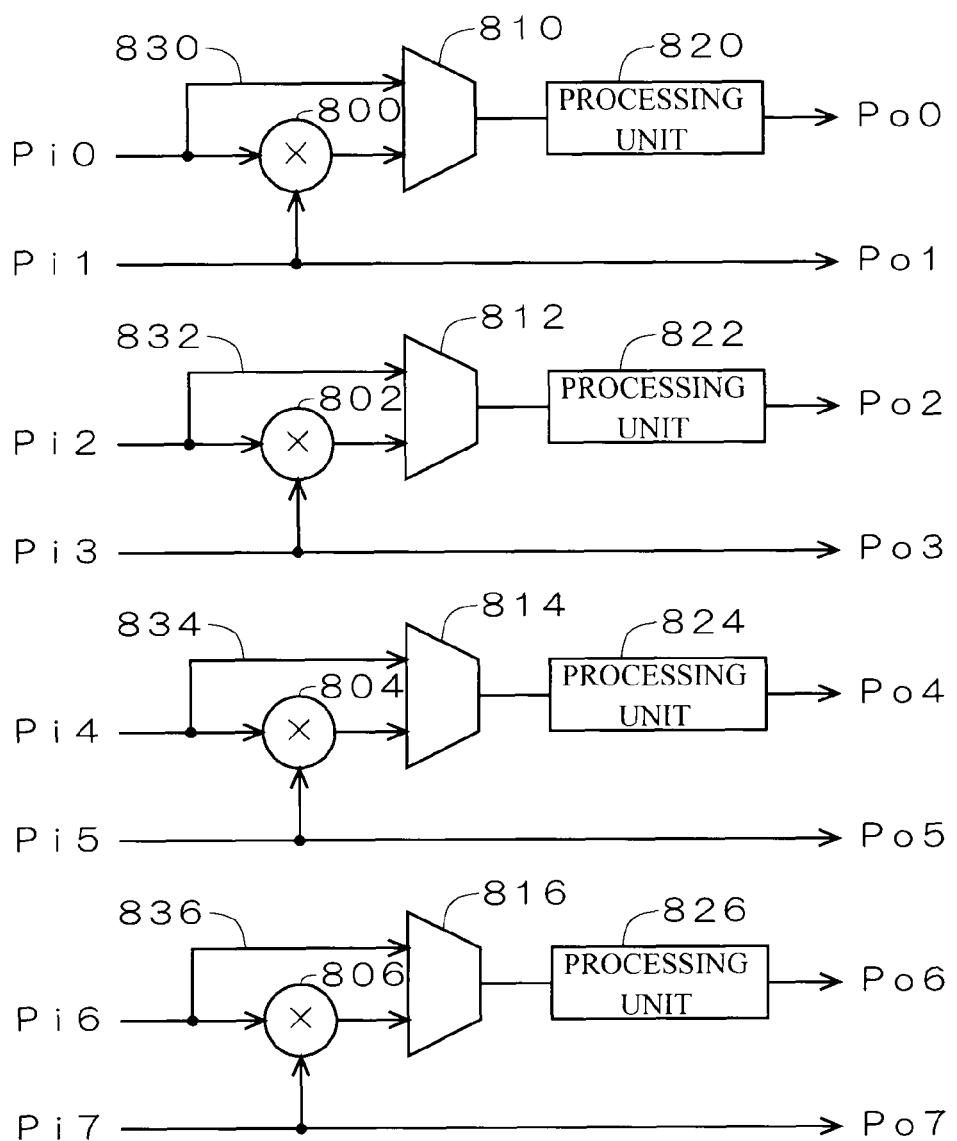
FIG. 12 is a circuit diagram illustrating a configuration of a processing block of a multiplication cell.

FIG. 12 is a circuit diagram illustrating a configuration of the processing block 41 of the multiplication cell Mu. A zero-th channel includes a multiplier 800, a selector 810, and a processing unit 820 connected between the input terminal Pi0 and the output terminal Po0. The input terminal of the multiplier 800 is connected to the input terminals Pi0 and Pi1. The multiplier 800 multiplies image data received from the input terminal Pi0 by image data received from the input terminal Pi1, and input the multiplied image data to the selector 810. The processing unit 820 right-shifts the image data received from the selector 810 by a predetermined bit number set by the setting unit 14. The processing unit 820 also functions as a limiter to limit the image data to a predetermined bit number set by the setting unit 14. Arbitrary setting of processing by the processing unit 820 is achieved by the setting unit 14. The selector 810 is also connected to a path 830 that is connected from the input terminal Pi0 without the multiplier 800. The selector 810 selects either one of the input terminal connected to the path 830 and the input terminal connected to the multiplier 800, based on the setting by the setting unit 14.

Similarly, second, fourth, and sixth channels include multipliers 802, 804, and 806, selectors 812, 814, and 816, and processing units 822, 824, and 826 connected between the input terminals Pi2, Pi4, and Pi6 and the output terminals Po2, Po4, and Po6, respectively. The input terminals of the multipliers 802, 804, and 806 are connected to the input terminals Pi2 and Pi3, the input terminals Pi4 and Pi5, and the input terminals Pi6 and Pi7, respectively. The multipliers 802, 804, and 806 multiply image data received from the input terminals Pi2, Pi4, and Pi6 by image data received from the input terminals Pi3, Pi5, and Pi7, and input the multiplied image data to the selectors 812, 814, and 816, respectively. The processing units 822, 824, and 826 right-shift the image data respectively received from the selectors 812, 814, and 816 by a predetermined bit number set by the setting unit 14. The processing units 822, 824, and 826 also function as a limiter to limit the image data to a predetermined bit number set by the setting unit 14. Arbitrary setting of processing by the processing units 822, 824, and 826 is achieved by the setting unit 14. The selectors 812, 814, and 816 are also connected to paths 832, 834, and 836 that are connected from the input terminals Pi2, Pi4, and Pi6 without the multipliers 802, 804, and 806, respectively. The selectors 812, 814, and 816 respectively select either one of the input terminal connected to the paths 832, 834, and 836 and the input terminal connected to the multipliers 802, 804, and 806, based on the setting by the setting unit 14.

In contrast, first, third, fifth, and seventh channels include no multiplier 800, no selector 810, and no processing unit 820 connected between the input terminals Pi1, Pi3, Pi5, and Pi7 and the output terminals Po1, Po3, Po5, and Po7, with the input terminals Pi1, Pi3, Pi5, and Pi7 directly connected to the output terminals Po1, Po3, Po5, and Po7, respectively. Thus the image data inputted to the input terminals Pi1, Pi3, Pi5, and Pi7 is respectively outputted from the output terminals Po1, Po3, Po5, and Po7, without being processed by any of the multiplier 800 and the processing unit 820.

Figure 13:
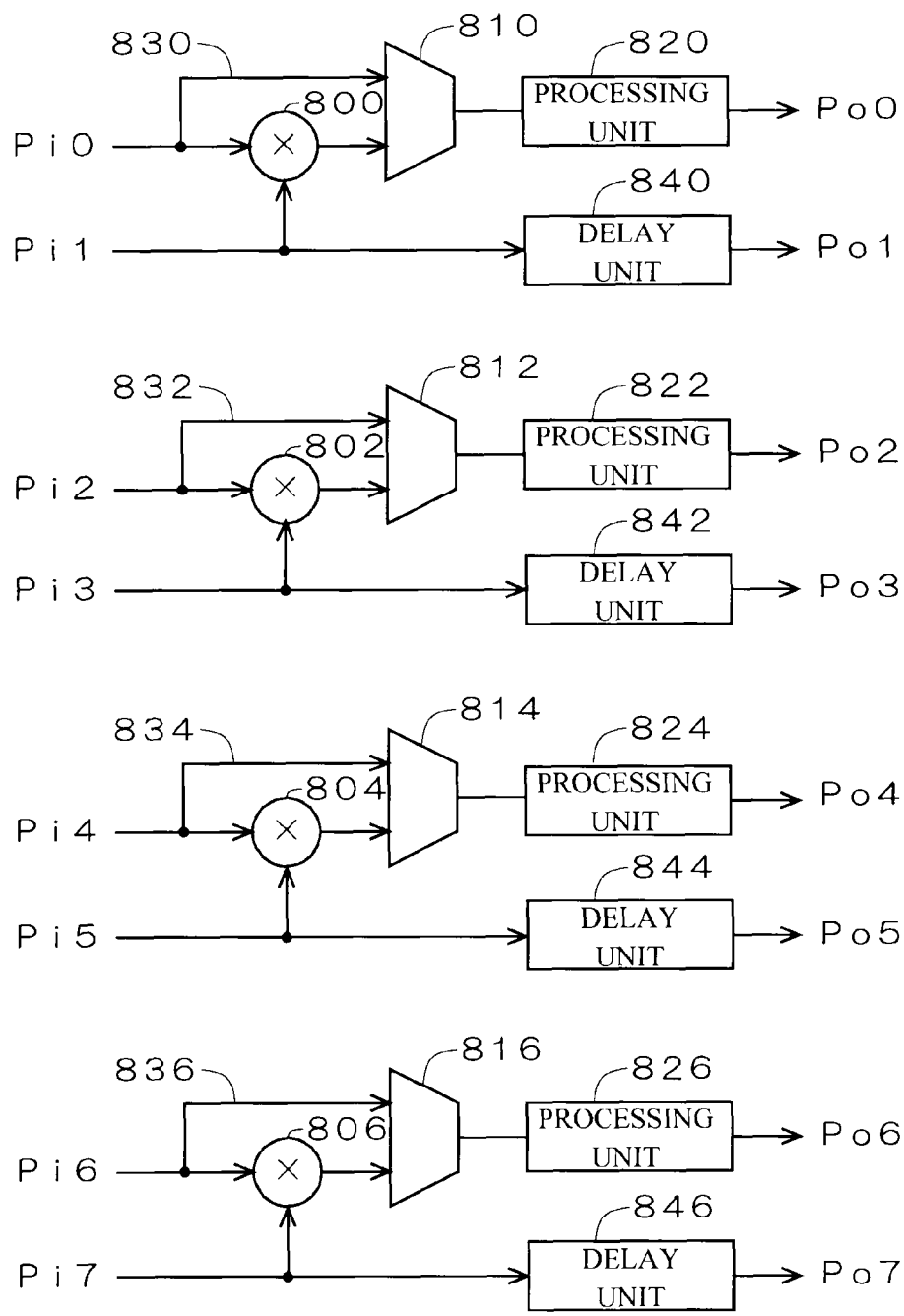
FIG. 13 is a circuit diagram illustrating a configuration of a processing block of a multiplication cell according to a modification.

FIG. 13 is a circuit diagram illustrating a configuration of the processing block 41 of a multiplication cell MuD according to a modification. The configurations of zero-th, second, fourth, and sixth channels are the same as those illustrated in FIG. 12. First, third, fifth, and seventh channels include delay units 840, 842, 844, and 846 connected between the input terminals Pi1, Pi3, Pi5, and Pi7 and the output terminals Po1, Po3, Po5, and Po7, respectively. The delay units 840, 842, 844, and 846 delay output of the image data respectively inputted to the input terminals Pi1, Pi3, Pi5, and Pi7 by a delay amount equivalent of time required for the above processing in the zero-th, the second, the fourth, and the sixth channels.

Figure 14:
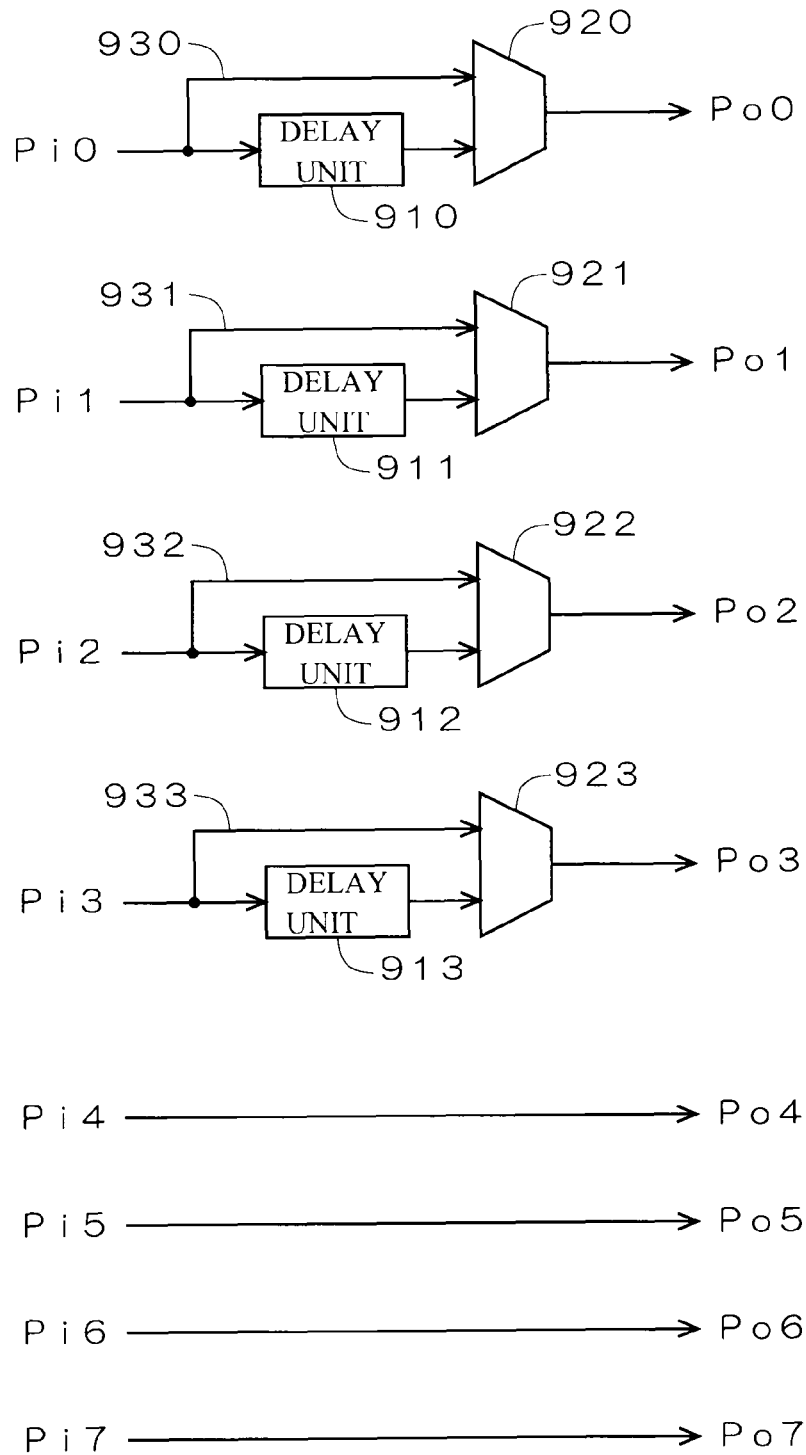
FIG. 14 is a circuit diagram illustrating a configuration of a processing block of a delay cell.

FIG. 14 is a circuit diagram illustrating a configuration of the processing block 41 of the delay cell De64. A zero-th channel includes a delay unit 910 and a selector 920 connected between the input terminal Pi0 and the output terminal Po0. The delay unit 910 employs, for example, an SRAM (Static Random Access Memory). The delay unit 910 delays output of image data received from the input terminal Pi0 by a predetermined clock cycles (one to 64 clock cycles) set by the setting unit 14. The image data outputted from the delay unit 910 is inputted to the selector 920. The selector 920 is also connected to a path 930 that is connected from the input terminal Pi0 without the delay unit 910. The selector 920 selects either one of the input terminal connected to the path 930 and the input terminal connected to the delay unit 910, based on the setting by the setting unit 14.

Similarly, first to third channels include delay units 911 to 913 and selectors 921 to 923 connected between the input terminals Pi1 to Pi3 and the output terminals Po1 to Po3, respectively. The delay units 911 to 913 employ, for example, an SRAM (Static Random Access Memory). The delay units 911 to 913 delay output of image data respectively received from the input terminals Pi1 to Pi3 by a predetermined clock cycles (one to 64 clock cycles) set by the setting unit 14. The image data outputted from the delay units 911 to 913 is respectively inputted to the selectors 921 to 923. The selectors 921 to 923 are also connected to paths 931 to 933 that are connected from the input terminals Pi1 to Pi3 without the delay units 911 to 913, respectively. The selectors 921 to 923 respectively select either one of the input terminal connected to the paths 931 to 933 and the input terminal connected to the delay units 911 to 913, based on the setting by the setting unit 14.

In contrast, fourth to seventh channels include no delay unit 910 and no selector 920 connected between the input terminals Pi4 to Pi7 and the output terminals Po4 to Po7, with the input terminals Pi4 to Pi7 directly connected to the output terminals Po4 to Po7, respectively. Thus the image data inputted to the input terminals Pi4 to Pi7 is respectively outputted from the output terminals Po4 to Po7, without being delayed by the delay unit 910.

Figure 15:
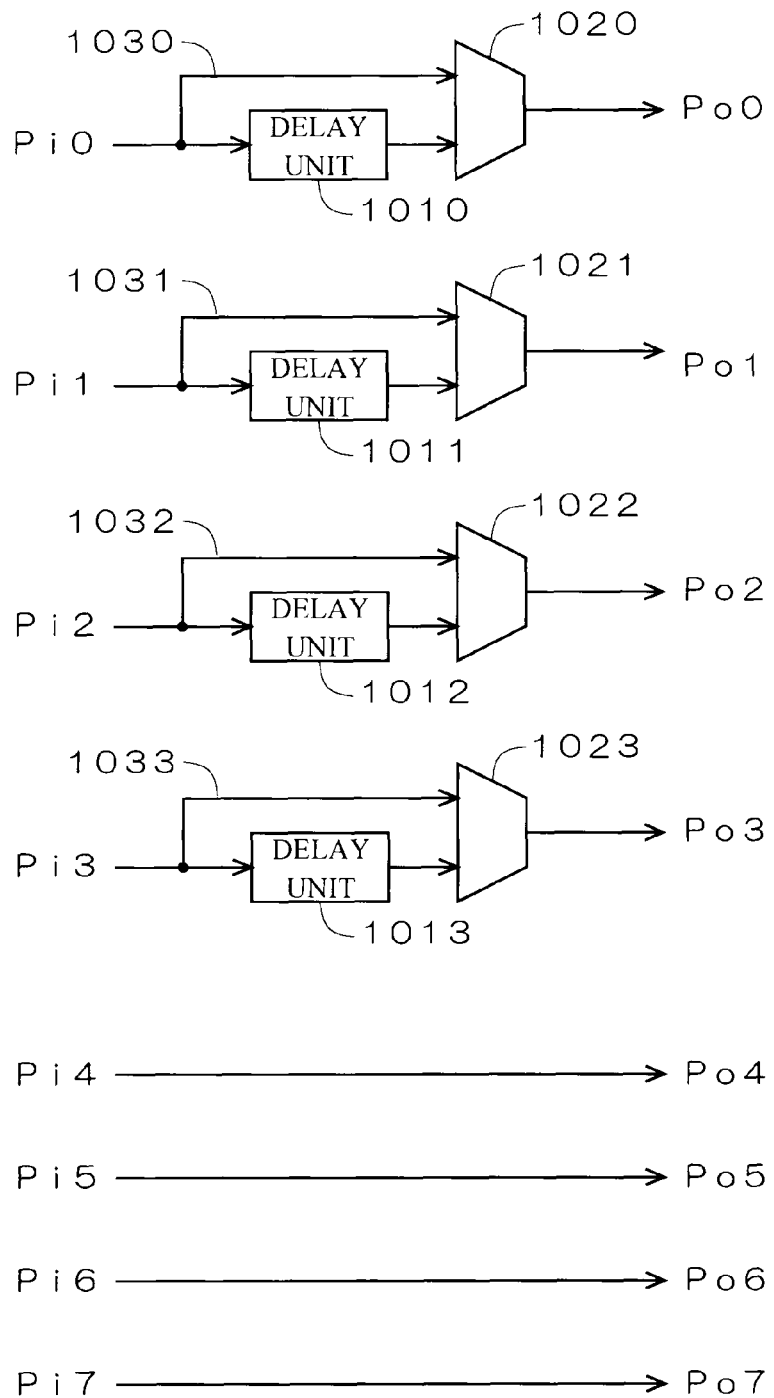
FIG. 15 is a circuit diagram illustrating a configuration of a processing block of a delay cell.

FIG. 15 is a circuit diagram illustrating a configuration of the processing block 41 of the delay cell De7. A zero-th channel includes a delay unit 1010 and a selector 1020 connected between the input terminal Pi0 and the output terminal Po0. The delay unit 1010 delays output of image data received from the input terminal Pi0 by a predetermined clock cycles (one to seven clock cycles) set by the setting unit 14.

Figure 16:
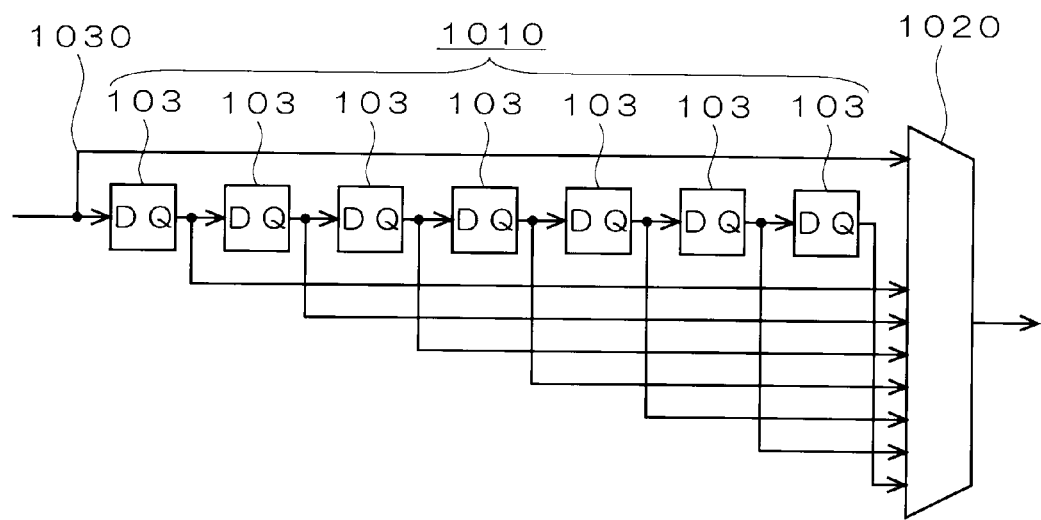
FIG. 16 is a circuit diagram illustrating details of a configuration of a delay unit and a selector.

FIG. 16 is a circuit diagram illustrating details of a configuration of the delay unit 1010 and the selector 1020. The delay unit 1010 has a configuration in which seven flip-flops 103 are connected in series. Output of each of the flip-flops 103 is connected to the selector 1020. Arbitrary setting of delay amount of image data within one to seven clock cycles is achieved by selecting output of the flip-flops 103 by the selector 1020. The selector 1020 is also connected to a path 1030 that is connected from the input terminal Pi0 without the delay unit 1010. The selector 1020 selects one input terminal from the input terminal connected to the path 1030 and the seven input terminals connected to the delay unit 1010, based on the setting by the setting unit 14.

Referring to FIG. 15, similar to the zero-th terminal, first to third channels include delay units 1011 to 1013 and selectors 1021 to 1023 connected between the input terminals Pi1 to Pi3 and the output terminals Po1 to Po3, respectively. Similar to the delay unit 1010, the delay units 1011 to 1013 have a configuration in which seven flip-flops 103 are connected in series. Output of each of the flip-flops 103 is connected to the selectors 1021 to 1023. Arbitrary setting of delay amount of image data within one to seven clock cycles is achieved by selecting output of the flip-flops 103 by each of the selectors 1021 to 1023. The selectors 1021 to 1023 are also connected to paths 1031 to 1033 that are connected from the input terminals Pi1 to Pi3 without the delay units 1011 to 1013, respectively. The selectors 1021 to 1023 each select one input terminal from the input terminal connected to the paths 1031 to 1033 and the seven input terminals connected to the delay units 1011 to 1013, based on the setting by the setting unit 14, respectively.

In contrast, fourth to seventh channels include no delay unit 1010 and no selector 1020 connected between the input terminals Pi4 to Pi7 and the output terminals Po4 to Po7, with the input terminals Pi4 to Pi7 directly connected to the output terminals Po4 to Po7, respectively. Thus the image data inputted to the input terminals Pi4 to Pi7 is respectively outputted from the output terminals Po4 to Po7, without being delayed by the delay unit 1010.

Figure 17:
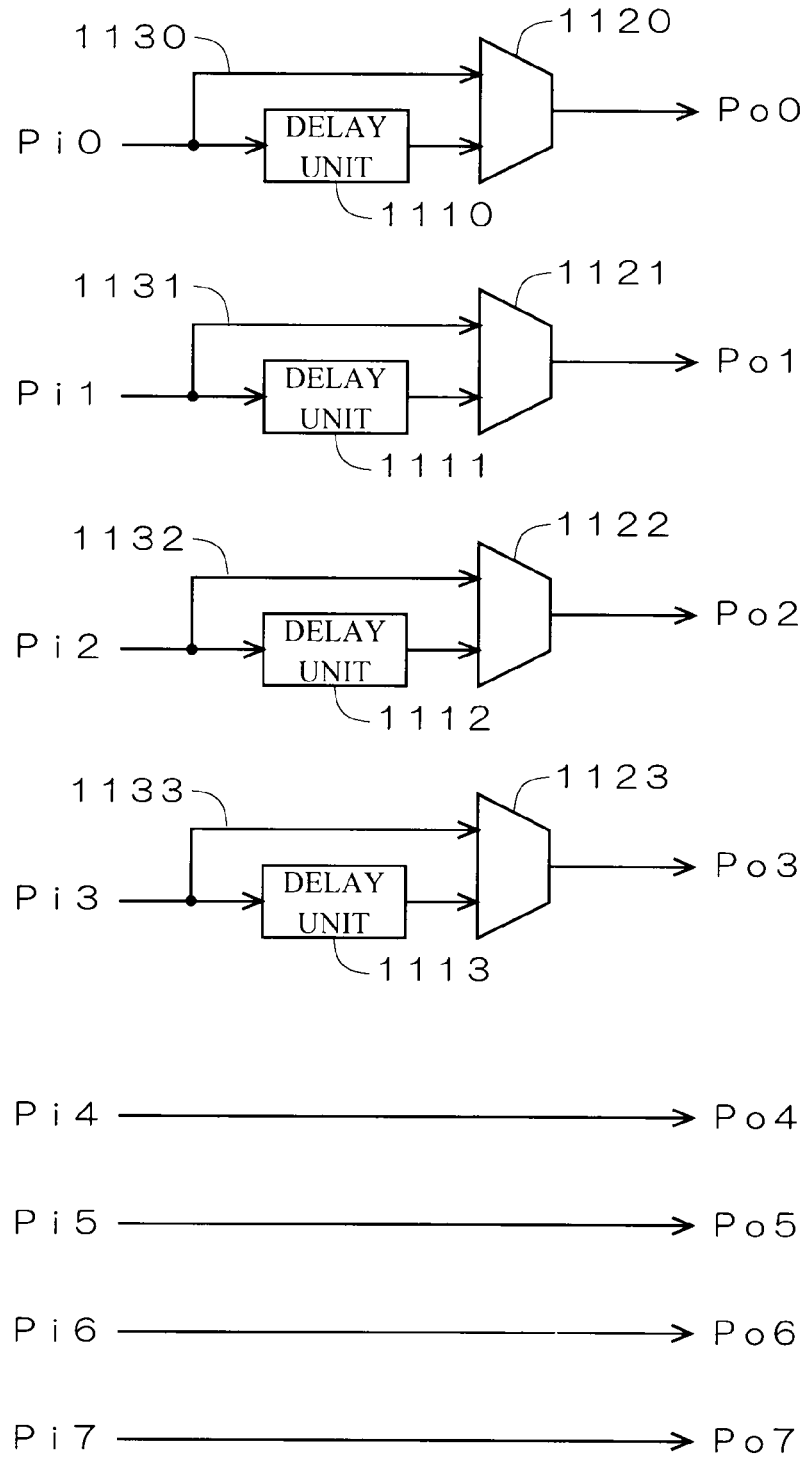
FIG. 17 is a circuit diagram illustrating a configuration of a processing block of a delay cell.

FIG. 17 is a circuit diagram illustrating a configuration of the processing block 41 of the delay cell De3. A zero-th channel includes a delay unit 1110 and a selector 1120 connected between the input terminal Pi0 and the output terminal Po0. The delay unit 1110 delays output of image data received from the input terminal Pi0 by a predetermined clock cycles (one to three clock cycles) set by the setting unit 14.

Figure 18:
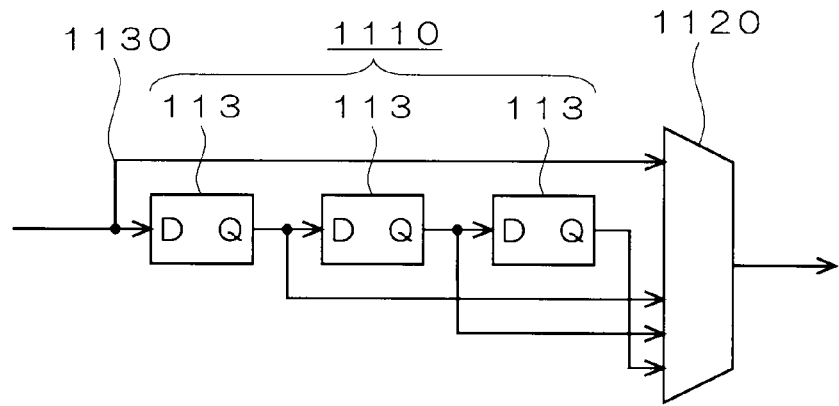
FIG. 18 is a circuit diagram illustrating details of a configuration of a delay unit and a selector.

FIG. 18 is a circuit diagram illustrating details of a configuration of the delay unit 1110 and the selector 1120. The delay unit 1110 has a configuration in which three flip-flops 113 are connected in series. Output of each of the flip-flops 113 is connected to the selector 1120. Arbitrary setting of delay amount of image data within one to three clock cycles is achieved by selecting output of the flip-flops 113 by the selector 1120. The selector 1120 is also connected to a path 1130 that is connected from the input terminal Pi0 without the delay unit 1110. The selector 1120 selects one input terminal from the input terminal connected to the path 1130 and the three input terminals connected to the delay unit 1110, based on the setting by the setting unit 14.

Referring to FIG. 17, similar to the zero-th terminal, first to third channels include delay units 1111 to 1113 and selectors 1121 to 1123 connected between the input terminals Pi1 to Pi3 and the output terminals Po1 to Po3, respectively. Similar to the delay unit 1110, the delay units 1111 to 1113 have a configuration in which three flip-flops 113 are connected in series. Output of each of the flip-flops 113 is connected to the selectors 1121 to 1123. Arbitrary setting of delay amount of image data within one to three clock cycles is achieved by selecting output of the flip-flops 113 by each of the selectors 1121 to 1123. The selectors 1121 to 1123 are also connected to paths 1131 to 1133 that are connected from the input terminals Pi1 to Pi3 without the delay units 1111 to 1113, respectively. The selectors 1121 to 1123 each select one input terminal from the input terminal connected to the paths 1131 to 1133 and the three input terminals connected to the delay units 1111 to 1113, based on the setting by the setting unit 14, respectively.

In contrast, fourth to seventh channels include no delay unit 1110 and no selector 1120 connected between the input terminals Pi4 to Pi7 and the output terminals Po4 to Po7, with the input terminals Pi4 to Pi7 directly connected to the output terminals Po4 to Po7, respectively. Thus the image data inputted to the input terminals Pi4 to Pi7 is respectively outputted from the output terminals Po4 to Po7, without being delayed by the delay unit 1110.

Figure 19:
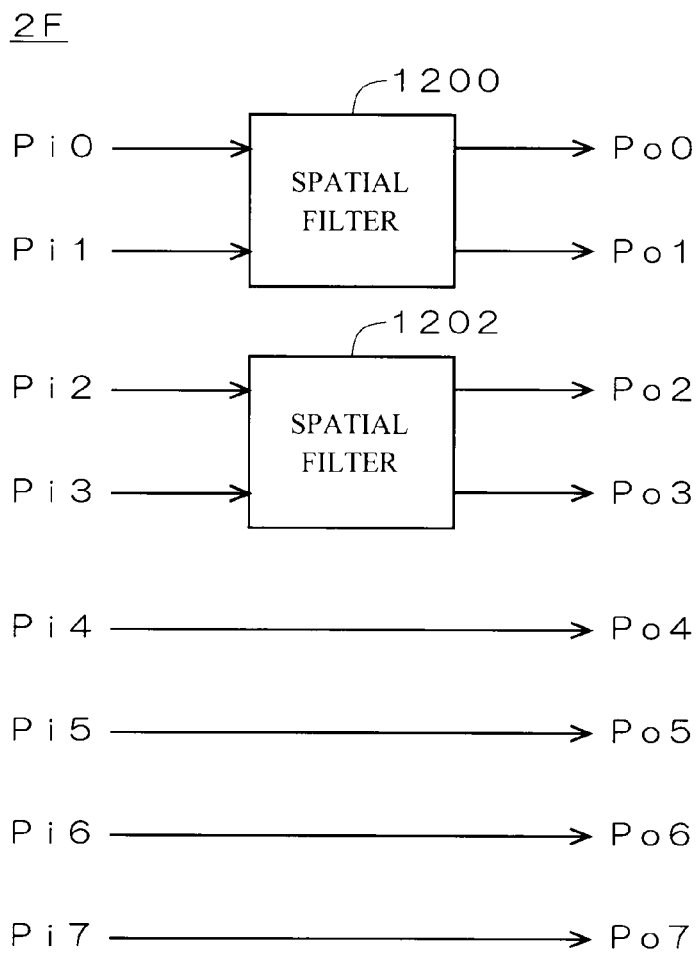
FIG. 19 is a circuit diagram illustrating a configuration of a processing block of a spatial filtering cell.

FIG. 19 is a circuit diagram illustrating a configuration of the processing block 41 of the spatial filtering cell 2F. Zero-th to third channels include a spatial filter 1200 connected between the input terminals Pi0 and Pi1 and the output terminals Po0 and Po1, and a spatial filter 1202 connected between the input terminals Pi2 and Pi3 and the output terminals Po2 and Po3.

In contrast, fourth to seventh channels include no spatial filter connected between the input terminals Pi4 to Pi7 and the output terminals Po4 to Po7, with the input terminals Pi4 to Pi7 directly connected to the output terminals Po4 to Po7, respectively. Thus the image data inputted to the input terminals Pi4 to Pi7 is respectively outputted from the output terminals Po4 to Po7, without being processed by the spatial filter.

Figure 20:
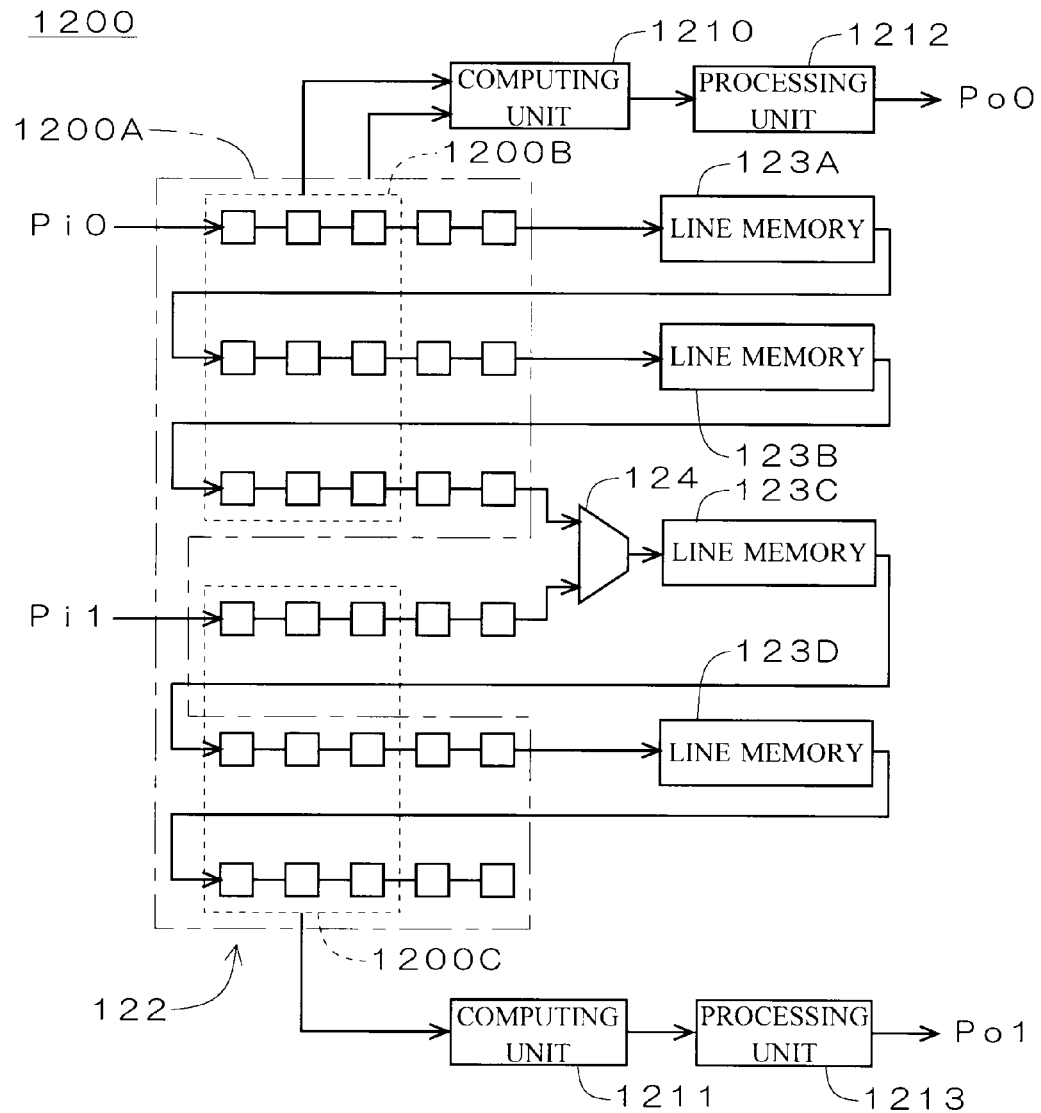
FIG. 20 is a circuit diagram illustrating a configuration of a spatial filter.

FIG. 20 is a circuit diagram illustrating a configuration of the spatial filter 1200. As illustrated in FIG. 20, the spatial filter 1200 includes a cell group 122 of 6 rows×5 columns, line memories 123A to 123D, computing units 1210 and 1211, processing units 1212 and 1213, and a selector 124.

The first row of the cell group 122 has input connected to the input terminal Pi0 and output connected to input of the line memory 123A. The second row of the cell group 122 has input connected to output of the line memory 123A and output connected to input of the line memory 123B. The third row of the cell group 122 has input connected to output of the line memory 123B and output connected to the input terminal of the selector 124. The fourth row of the cell group 122 has input connected to the input terminal Pi1 and output connected to the input terminal of the selector 124. The output terminal of the selector 124 is connected to input of the line memory 123C. The fifth row of the cell group 122 has input connected to output of the line memory 123C and output connected to input of the line memory 123D. The sixth row of the cell group 122 has input connected to output of the line memory 123D.

The spatial filter 1200 may be used as a spatial filter 1200A of 5×5 taps, or alternatively as spatial filters 1200B and 1200C of 3×3 taps, based on the setting by the setting unit 14. For use as the spatial filter 1200A, the selector 124 selects the input terminal connected to the third row of the cell group 122. In such a case, the spatial filter 1200A receives input of image data from the input terminal Pi0. In contrast, for use as the spatial filters 1200B and 1200C, the selector 124 selects the input terminal connected to the fourth row of the cell group 122. In such a case, the spatial filter 1200B receives input of image data from the input terminal Pi0, while the spatial filter 1200C receives input of image data from the input terminal Pi1, and thus the spatial filters 1200B and 1200C can be used independently from each other.

The computing unit 1210 performs a predetermined filter computing on the image data of each cell received from the spatial filters 1200A and 1200B, based on a coefficient correspondingly set for each cell. The processing unit 1212 right-shifts the image data received from the computing unit 1210 by a predetermined bit number set by the setting unit 14. The processing unit 1212 also functions as a limiter to limit the image data to a predetermined bit number set by the setting unit 14. Arbitrary setting of processing by the processing unit 1212 is achieved by the setting unit 14.

Similarly, the computing unit 1211 performs a predetermined filter computing on the image data of each cell received from the spatial filter 1200C, based on a coefficient correspondingly set for each cell. The processing unit 1213 right-shifts the image data received from the computing unit 1211 by a predetermined bit number set by the setting unit 14. The processing unit 1213 also functions as a limiter to limit the image data to a predetermined bit number set by the setting unit 14. Arbitrary setting of processing by the processing unit 1213 is achieved by the setting unit 14.

As the spatial filters 1200A and 1200B are programmable filters, arbitrary setting of coefficients corresponding to each cell of the spatial filters 1200A and 1200B is achieved by the setting unit 14. In contrast, as the spatial filter 1200C is a filter with a fixed coefficient, coefficients corresponding to each cell of the spatial filter 1200C are defined in advance.

Figure 21:
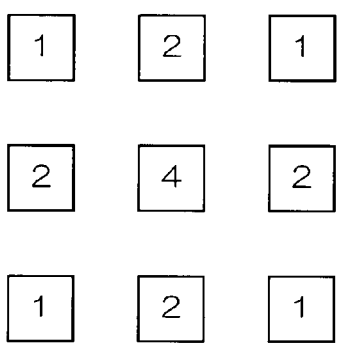
FIG. 21 is a diagram illustrating an example of coefficients defined corresponding to each cell of the spatial filter.

FIG. 21 is a diagram illustrating an example of coefficients defined corresponding to each cell of the spatial filter 1200C. In this example, the spatial filter 1200C is used as a lowpass filter with 3×3 taps and fixed coefficients.

Figure 22:
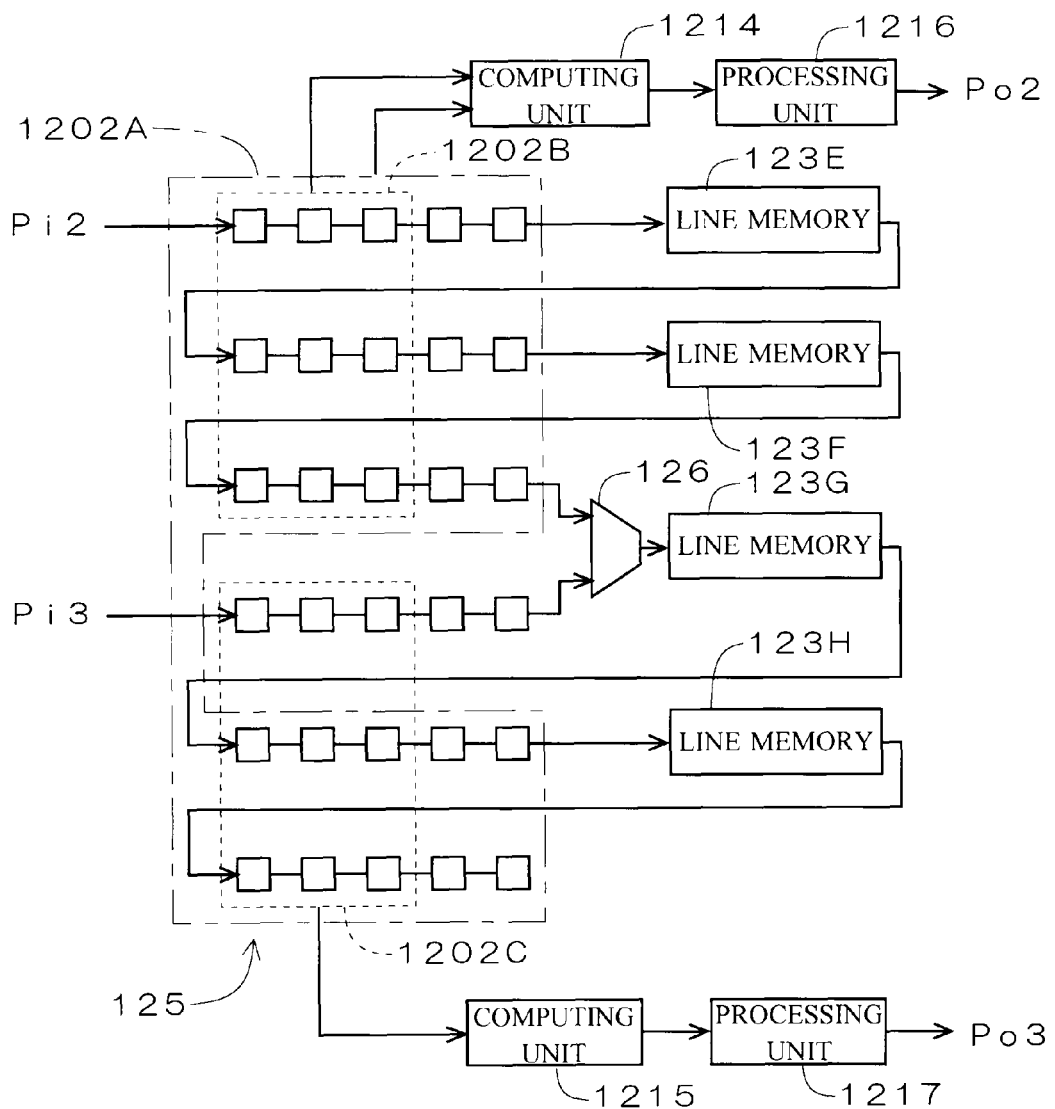
FIG. 22 is a circuit diagram illustrating a configuration of a spatial filter.

FIG. 22 is a circuit diagram illustrating a configuration of the spatial filter 1202. As illustrated in FIG. 22, the spatial filter 1202 includes a cell group 125 of 6 rows×5 columns, line memories 123E to 123H, computing units 1214 and 1215, processing units 1216 and 1217, and a selector 126.

The first row of the cell group 125 has input connected to the input terminal Pi2 and output connected to input of the line memory 123E. The second row of the cell group 125 has input connected to output of the line memory 123E and output connected to input of the line memory 123F. The third row of the cell group 125 has input connected to output of the line memory 123F and output connected to the input terminal of the selector 126. The fourth row of the cell group 125 has input connected to the input terminal Pi3 and output connected to the input terminal of the selector 126. The output terminal of the selector 126 is connected to input of the line memory 123G. The fifth row of the cell group 125 has input connected to output of the line memory 123G and output connected to input of the line memory 123H. The sixth row of the cell group 125 has input connected to output of the line memory 123H.

The spatial filter 1202 may be used as a spatial filter 1202A of 5×5 taps, or alternatively as spatial filters 1202B and 1202C of 3×3 taps, based on the setting by the setting unit 14. For use as the spatial filter 1202A, the selector 126 selects the input terminal connected to the third row of the cell group 125. In such a case, the spatial filter 1202A receives input of image data from the input terminal Pi2. In contrast, for use as the spatial filters 1202B and 1202C, the selector 126 selects the input terminal connected to the fourth row of the cell group 125. In such a case, the spatial filter 1202B receives input of image data from the input terminal Pi2, while the spatial filter 1202C receives input of image data from the input terminal Pi3, and thus the spatial filters 1202B and 1202C can be used independently from each other.

The computing unit 1214 performs a predetermined filter computing on the image data of each cell received from the spatial filters 1202A and 1202B, based on a coefficient correspondingly set for each cell. The processing unit 1216 right-shifts the image data received from the computing unit 1214 by a predetermined bit number set by the setting unit 14. The processing unit 1216 also functions as a limiter to limit the image data to a predetermined bit number set by the setting unit 14. Arbitrary setting of processing by the processing unit 1216 is achieved by the setting unit 14.

Similarly, the computing unit 1215 performs a predetermined filter computing on the image data of each cell received from the spatial filter 1202C, based on a coefficient correspondingly set for each cell. The processing unit 1217 right-shifts the image data received from the computing unit 1215 by a predetermined bit number set by the setting unit 14. The processing unit 1217 also functions as a limiter to limit the image data to a predetermined bit number set by the setting unit 14. Arbitrary setting of processing by the processing unit 1217 is achieved by the setting unit 14.

As the spatial filters 1202A to 1202C are all filters with a fixed coefficient, coefficients corresponding to each cell of the spatial filters 1202A to 1202C are defined in advance.

Figure 23:
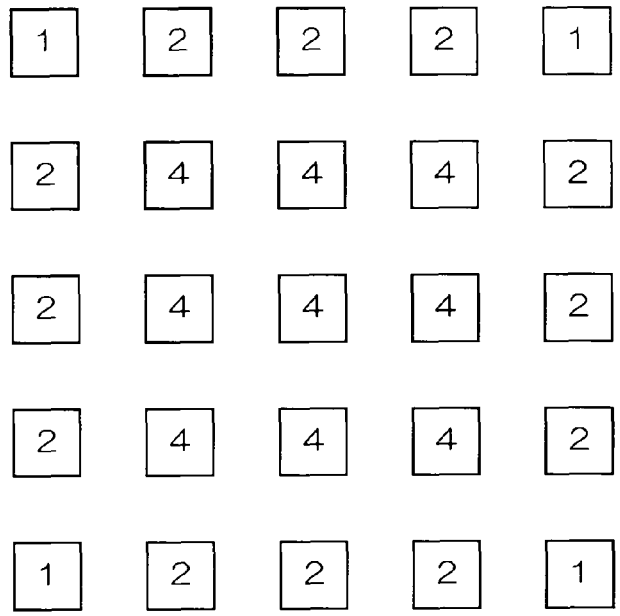
FIG. 23 is a diagram illustrating an example of coefficients defined corresponding to each cell of the spatial filter.

FIG. 23 is a diagram illustrating an example of coefficients defined corresponding to each cell of the spatial filter 1202A. In this example, the spatial filter 1202A is used as a lowpass filter with 5×5 taps and fixed coefficients. An example of coefficients defined corresponding to each cell of the spatial filters 1202B and 1202C is illustrated in FIG. 21. In this example, the spatial filters 1202B and 1202C are used as a lowpass filter with 3×3 taps and fixed coefficients.

Figure 24:
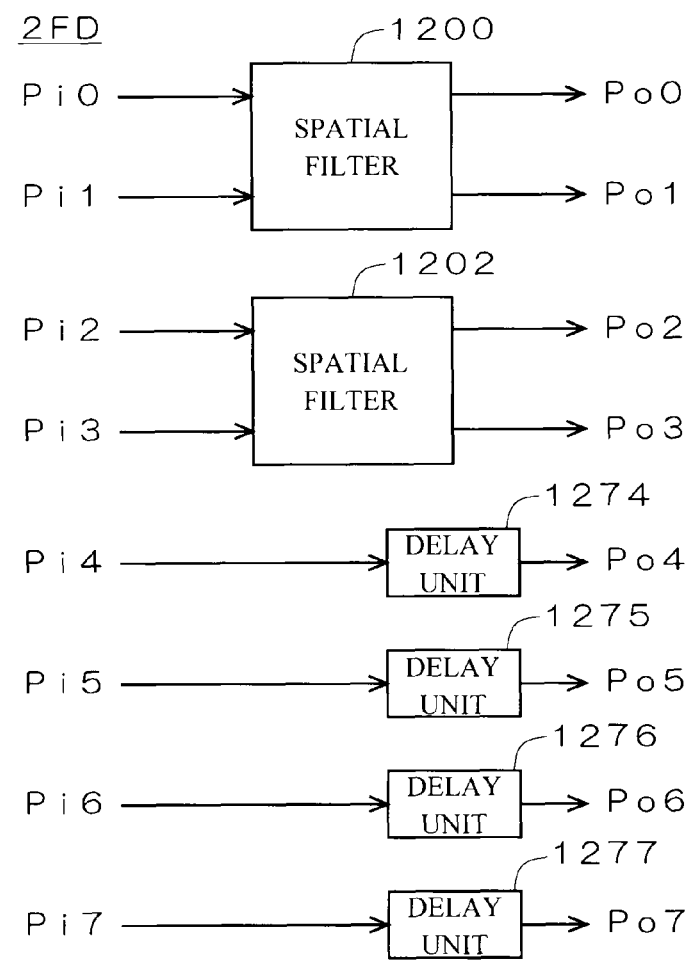
FIG. 24 is a circuit diagram illustrating a configuration of a processing block of a spatial filtering cell according to a modification.

FIG. 24 is a circuit diagram illustrating a configuration of the processing block 41 of a spatial filtering cell 2FD according to a modification. The configurations of zero-th to third channels are the same as those illustrated in FIGS. 19 to 23. Fourth to seventh channels include delay units 1274 to 1277 connected between the input terminals Pi4 to Pi7 and the output terminals Po4 to Po7, respectively. The delay units 1274 to 1277 delay output of the image data respectively inputted to the input terminals Pi4 to Pi7 by a delay amount equivalent of time required for the above processing in the zero-th to the third channels.

Figure 25:
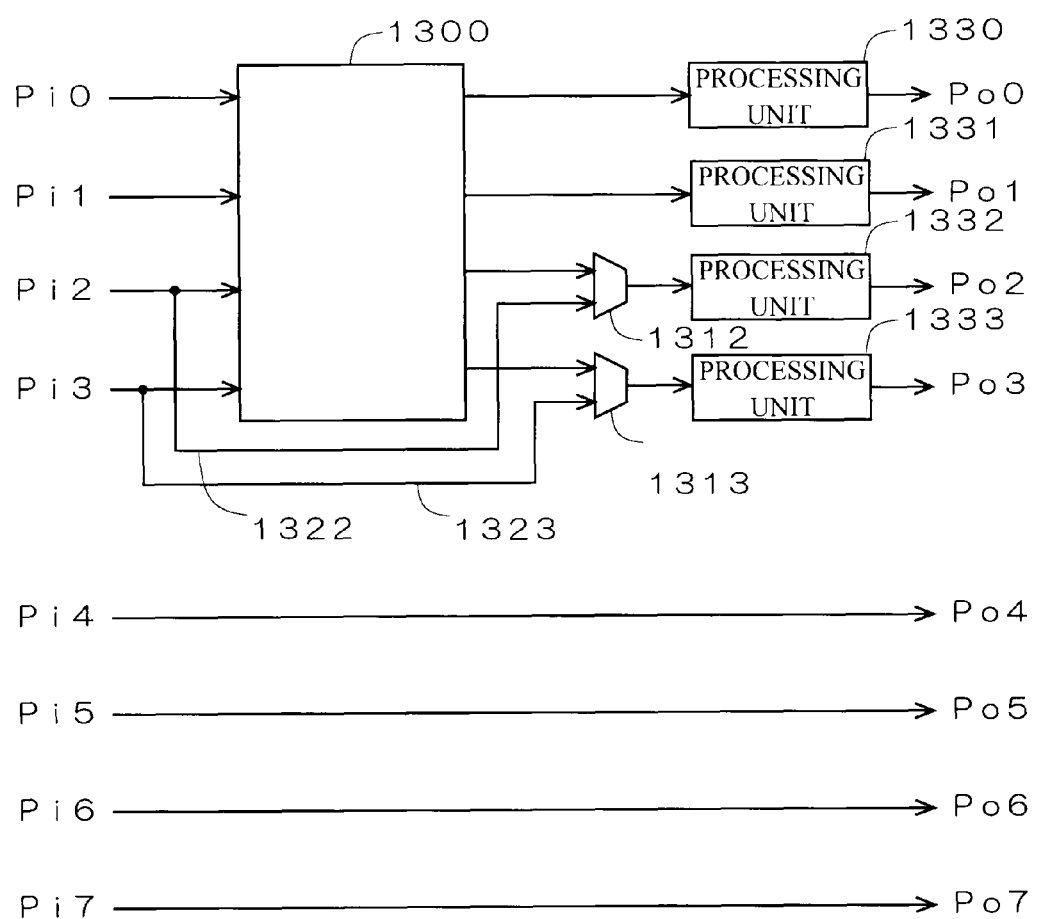
FIG. 25 is a circuit diagram illustrating a configuration of a processing block of a matrix computing cell.

FIG. 25 is a circuit diagram illustrating a configuration of the processing block 41 of the matrix computing cell Ma. Zero-th to third channels include a matrix computing circuit 1300 connected between the input terminals Pi0 to Pi3 and the output terminals Po0 to Po3. A processing unit 1330 is connected between the matrix computing circuit 1300 and the output terminal Po0, and a processing unit 1331 is connected between the matrix computing circuit 1300 and the output terminal Po1. A selector 1312 and a processing unit 1332 is connected between the matrix computing circuit 1300 and the output terminal Po2, and a selector 1313 and a processing unit 1333 is connected between the matrix computing circuit 1300 and the output terminal Po3.

The selectors 1312 and 1313 are also connected to paths 1322 and 1323 that are connected from the input terminals Pi2 and Pi3 without the matrix computing circuit 1300, respectively. The selectors 1312 and 1313 respectively select either one of the input terminal connected to the paths 1322 and 1323 and the input terminal connected to the matrix computing circuit 1300, based on the setting by the setting unit 14.

When the selectors 1312 and 1313 select the input terminal connected to the matrix computing circuit 1300, the matrix computing circuit 1300 performs matrix computation of an order 4×4 on image data received from the input terminals Pi0 to Pi3. When the selector 1312 selects the input terminal connected to the matrix computing circuit 1300 and the selector 1313 selects the input terminal connected to the path 1323, the matrix computing circuit 1300 performs matrix computation of an order 3×3 on image data received from the input terminals Pi0 to Pi2. When the selectors 1312 and 1313 select the input terminal connected to the paths 1322 and 1323 respectively, the matrix computing circuit 1300 performs matrix computation of an order 2×2 on image data received from the input terminals Pi0 and Pi1.

The processing units 1330 and 1331 right-shift the image data received from the matrix computing circuit 1300 by a predetermined bit number set by the setting unit 14. The processing units 1332 and 1333 right-shift the image data respectively received from the selectors 1312 and 1313 by a predetermined bit number set by the setting unit 14. The processing units 1330 to 1333 also function as a limiter to limit the image data to a predetermined bit number set by the setting unit 14. Arbitrary setting of processing by the processing units 1330 to 1333 is achieved by the setting unit 14.

Figure 26:
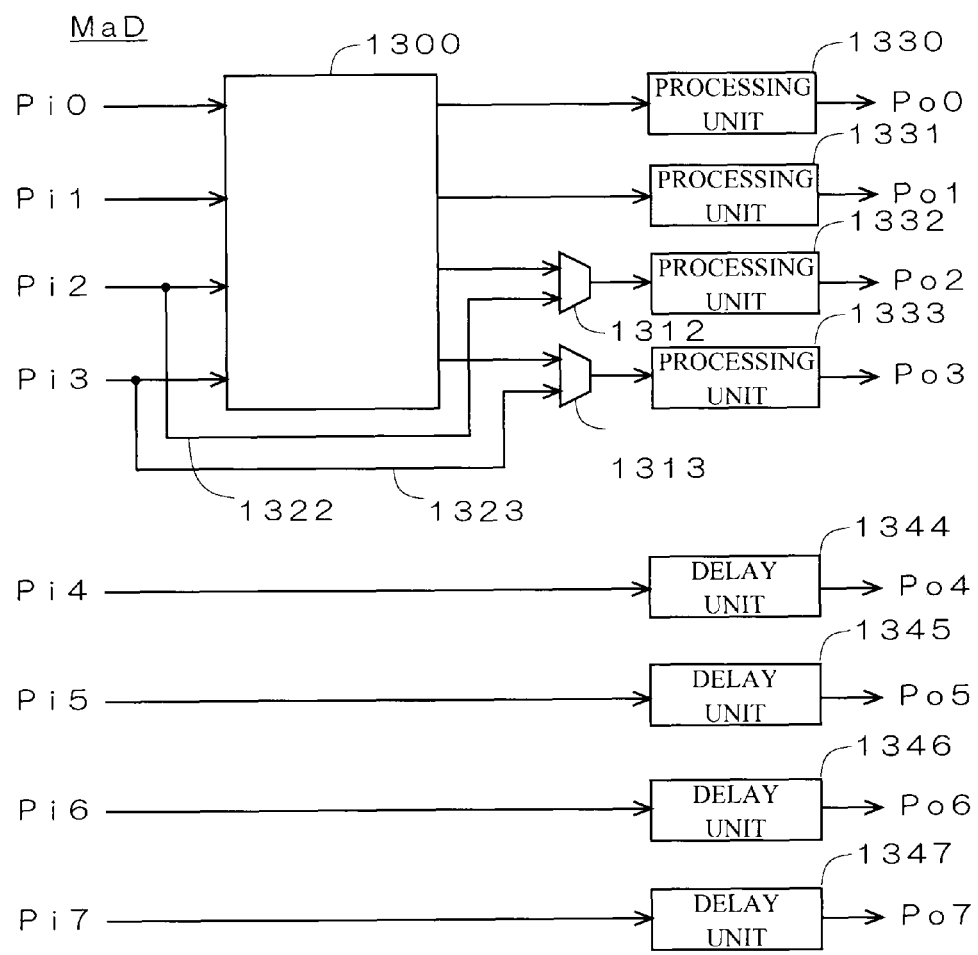
FIG. 26 is a circuit diagram illustrating a configuration of a processing block of a matrix computing cell according to a modification.

FIG. 26 is a circuit diagram illustrating a configuration of the processing block 41 of a matrix computing cell MaD according to a modification. The configurations of zero-th to third channels are the same as those illustrated in FIG. 25. Fourth to seventh channels include delay units 1344 to 1347 connected between the input terminals Pi4 to Pi7 and the output terminals Po4 to Po7, respectively. The delay units 1344 to 1347 delay output of the image data respectively inputted to the input terminals Pi4 to Pi7 by a delay amount equivalent of time required for the above processing in the zero-th to the third channels.

Figure 27:
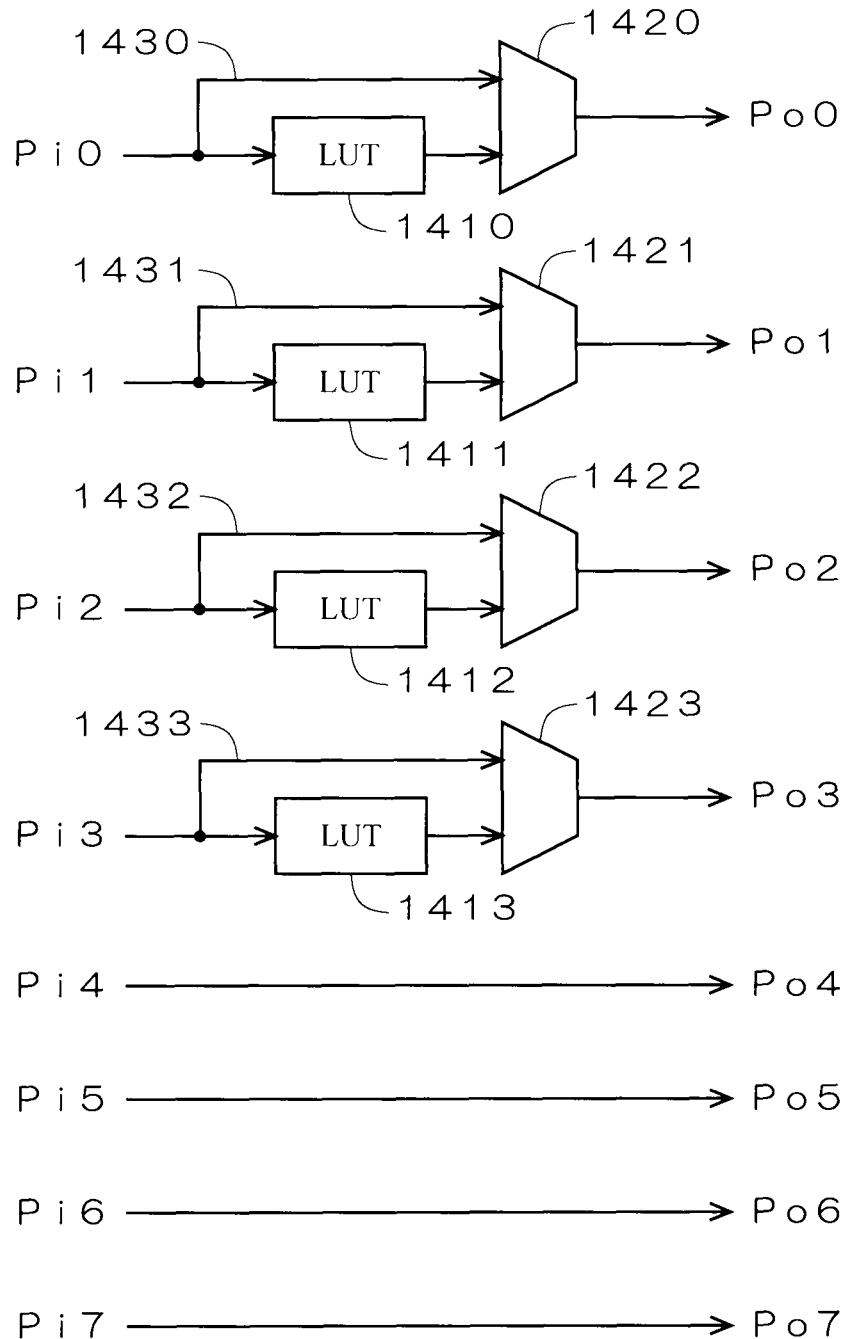
FIG. 27 is a circuit diagram illustrating a configuration of a processing block of a look-up table cell.

FIG. 27 is a circuit diagram illustrating a configuration of the processing block 41 of the look-up table cell LUT257. A zero-th channel includes an LUT 1410 and a selector 1420 connected between the input terminal Pi0 and the output terminal Po0. The LUT 1410 is a piecewise linear approximation circuit employing piecewise linear approximation with 256 broken lines (257 breakpoints), which reads out LUT data corresponding to image data received from the input terminal Pi0, performs bilinear interpolation on the read LUT data, and inputs the LUT data after bilinear interpolation to the selector 1420. The selector 1420 is also connected to a path 1430 that is connected from the input terminal Pi0 without the LUT 1410. The selector 1420 selects either one of the input terminal connected to the path 1430 and the input terminal connected to the LUT 1410, based on the setting by the setting unit 14.

Similarly, first to third channels include LUTs 1411 to 1413 and selectors 1421 to 1423 connected between the input terminals Pi1 to Pi3 and the output terminals Po1 to Po3, respectively. The LUTs 1411 to 1413 are a piecewise linear approximation circuit employing piecewise linear approximation with 256 broken lines (257 breakpoints), which read out LUT data corresponding to image data received from the input terminals Pi1 to Pi3, perform bilinear interpolation on the read LUT data, and input the LUT data after bilinear interpolation to the selectors 1421 to 1423, respectively. The selectors 1421 to 1423 are also connected to paths 1431 to 1433 that are connected from the input terminals Pi1 to Pi3 without the LUTs 1411 to 1413, respectively. The selectors 1421 to 1423 respectively select either one of the input terminal connected to the paths 1431 to 1433 and the input terminal connected to the LUTs 1411 to 1413, based on the setting by the setting unit 14.

In contrast, fourth to seventh channels include no LUT 1410 and no selector 1420 connected between the input terminals Pi4 to Pi7 and the output terminals Po4 to Po7, with the input terminals Pi4 to Pi7 directly connected to the output terminals Po4 to Po7, respectively. Thus the image data inputted to the input terminals Pi4 to Pi7 is respectively outputted from the output terminals Po4 to Po7, without being processed by the LUT 1410.

Figure 28:
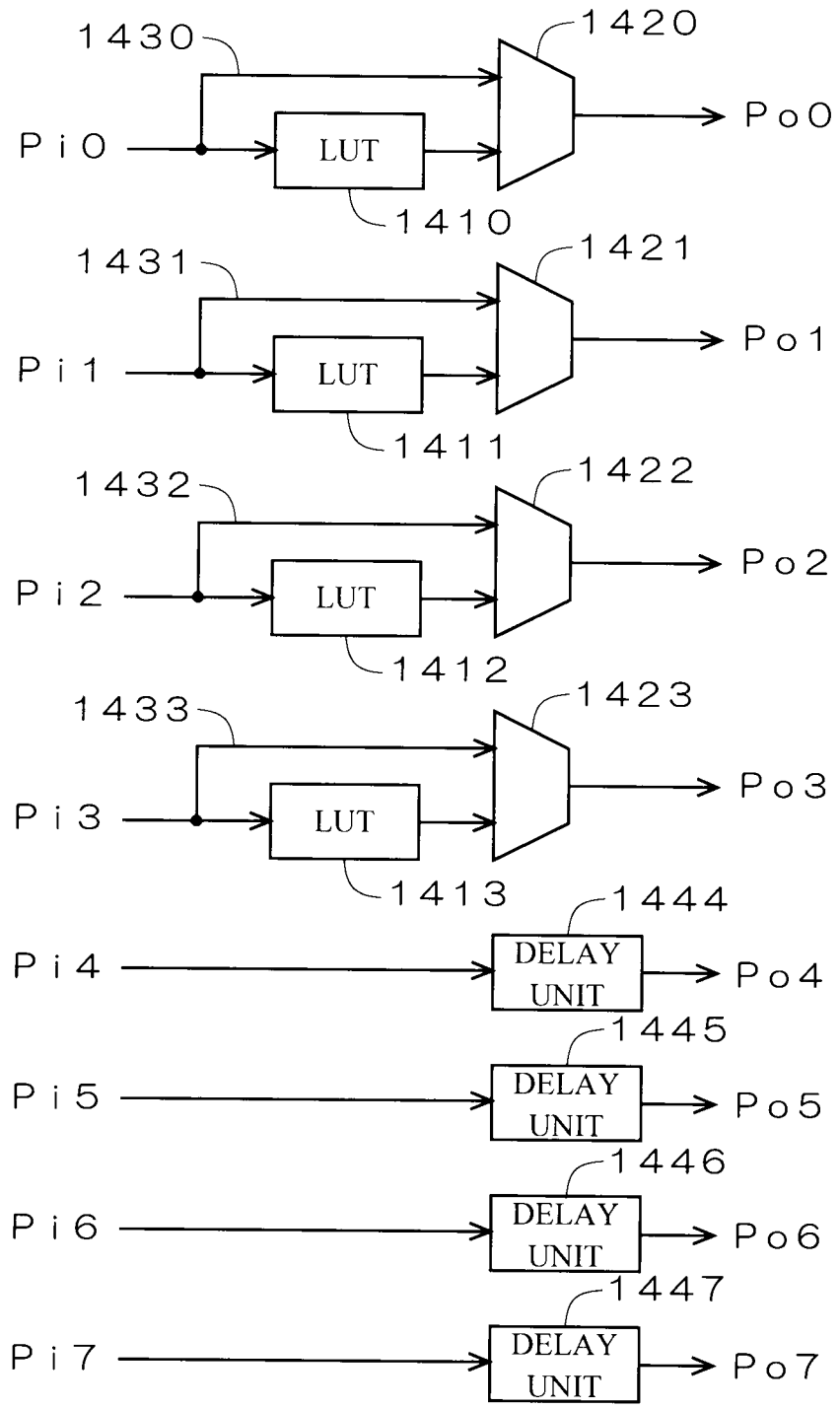
FIG. 28 is a circuit diagram illustrating a configuration of a processing block of a look-up table cell according to a modification.

FIG. 28 is a circuit diagram illustrating a configuration of the processing block 41 of a look-up table cell LUT257D according to a modification. The configurations of zero-th to third channels are the same as those illustrated in FIG. 27. Fourth to seventh channels include delay units 1444 to 1447 connected between the input terminals Pi4 to Pi7 and the output terminals Po4 to Po7, respectively. The delay units 1444 to 1447 delay output of the image data respectively inputted to the input terminals Pi4 to Pi7 by a delay amount equivalent of time required for the above processing in the zero-th to the third channels.

Figure 29:
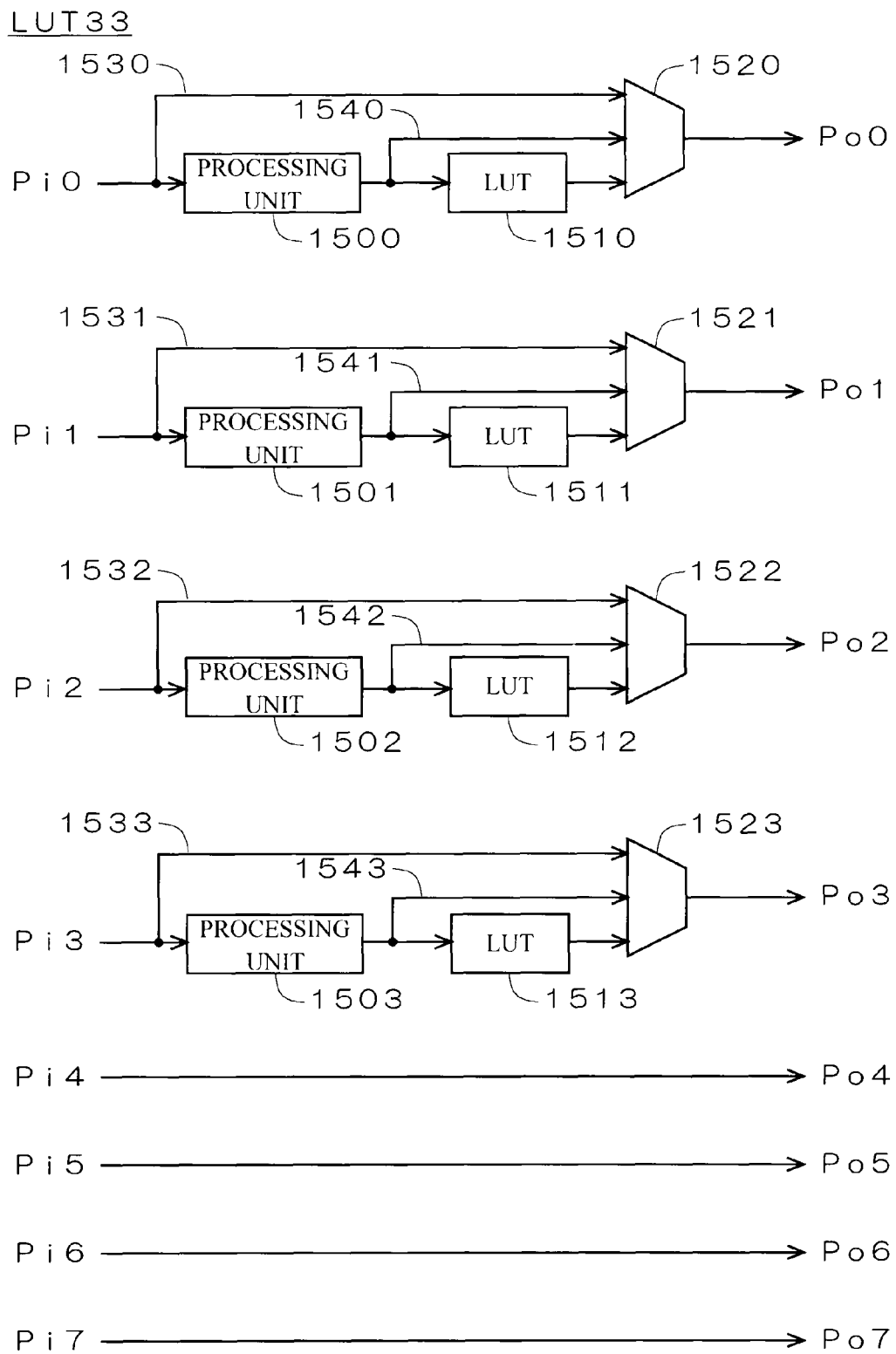
FIG. 29 is a circuit diagram illustrating a configuration of a processing block of a look-up table cell.

FIG. 29 is a circuit diagram illustrating a configuration of the processing block 41 of the look-up table cell LUT33. A zero-th channel includes a processing unit 1500, an LUT 1510, and a selector 1520 connected between the input terminal Pi0 and the output terminal Po0. The processing unit 1500 shifts image data received from the input terminal Pi0 by a predetermined bit number, based on the setting by the setting unit 14. The processing unit 1500 also functions as a limiter to limit the image data to a predetermined bit number set by the setting unit 14. The processing unit 1500 converts image data of, for example, 17 bits with a sign received from the input terminal Pi0 into image data of, for example, eight bits with a sign for output. The LUT 1510 is a piecewise linear approximation circuit employing piecewise linear approximation with 32 broken lines (33 breakpoints), which reads out LUT data corresponding to image data received from the processing unit 1500, performs bilinear interpolation on the read LUT data, and inputs the LUT data after bilinear interpolation to the selector 1520. The selector 1520 is also connected to a path 1530 that is connected from the input terminal Pi0 without the processing unit 1500 and the LUT 1510. Furthermore, the selector 1520 is also connected to a path 1540 that is connected from the processing unit 1500 without the LUT 1510. The selector 1520 selects any one of the input terminal connected to the path 1530, the input terminal connected to the path 1540, and the input terminal connected to the LUT 1510, based on the setting by the setting unit 14.

Similarly, first to third channels include processing units 1501 to 1503, LUTs 1511 to 1513, and selectors 1521 to 1523 connected between the input terminals Pi1 to Pi3 and the output terminals Po1 to Po3, respectively. The processing units 1501 to 1503 shift image data respectively received from the input terminals Pi1 to Pi3 by a predetermined bit number, based on the setting by the setting unit 14. The processing units 1501 to 1503 also function as a limiter to limit the image data to a predetermined bit number set by the setting unit 14. The processing units 1501 to 1503 convert image data of, for example, 17 bits with a sign respectively received from the input terminals Pi1 to Pi3 into image data of, for example, eight bits with a sign for output. The LUTs 1511 to 1513 are a piecewise linear approximation circuit employing piecewise linear approximation with 32 broken lines (33 breakpoints), which read out LUT data corresponding to image data received from the input terminals Pi1 to Pi3, perform bilinear interpolation on the read LUT data, and input the LUT data after bilinear interpolation to the selectors 1521 to 1523, respectively. The selectors 1521 to 1523 are also connected to paths 1531 to 1533 that are connected from the input terminals Pi1 to Pi3 without the processing units 1501 to 1503 and the LUTs 1511 to 1513, respectively. Furthermore, the selectors 1521 to 1523 are also connected to paths 1541 to 1543 that are connected from the processing units 1501 to 1503 without the LUTs 1511 to 1513, respectively. The selectors 1521 to 1523 respectively select any one of the input terminal connected to the paths 1531 to 1533, the input terminal connected to the paths 1541 to 1543, and the input terminal connected to the LUTs 1511 to 1513, based on the setting by the setting unit 14.

In contrast, fourth to seventh channels include no processing unit 1500, no LUT 1510, and no selector 1520 connected between the input terminals Pi4 to Pi7 and the output terminals Po4 to Po7, with the input terminals Pi4 to Pi7 directly connected to the output terminals Po4 to Po7, respectively. Thus image data inputted to the input terminals Pi4 to Pi7 is respectively outputted from the output terminals Po4 to Po7, without being processed by any of the processing unit 1500 and the LUT 1510.

Figure 30:
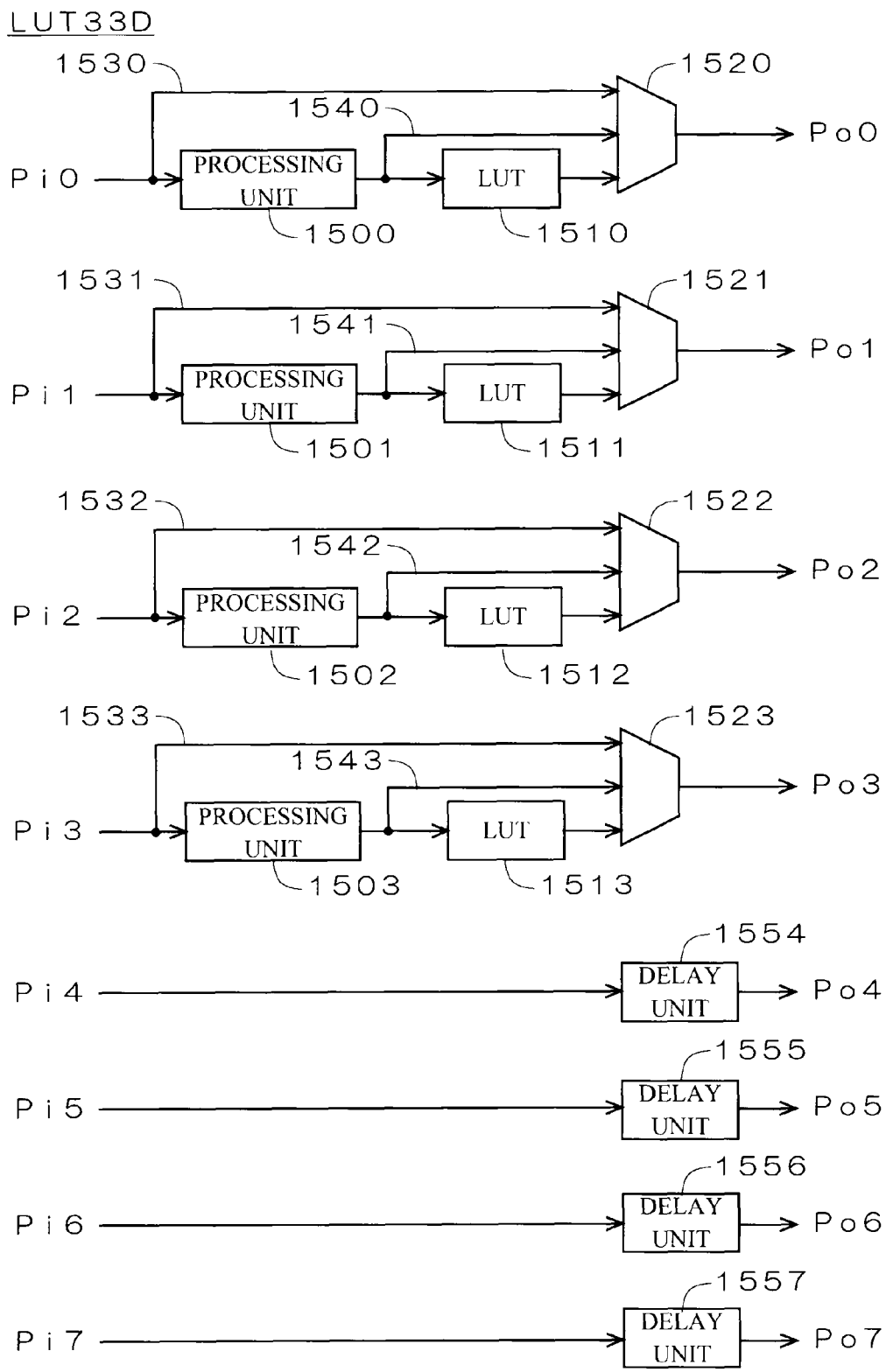
FIG. 30 is a circuit diagram illustrating a configuration of a processing block of a look-up table cell according to a modification.

FIG. 30 is a circuit diagram illustrating a configuration of the processing block 41 of a look-up table cell LUT33D according to a modification. The configurations of zero-th to third channels are the same as those illustrated in FIG. 29. Fourth to seventh channels include delay units 1554 to 1557 connected between the input terminals Pi4 to Pi7 and the output terminals Po4 to Po7, respectively. The delay units 1554 to 1557 delay output of the image data respectively inputted to the input terminals Pi4 to Pi7 by a delay amount equivalent of time required for the above processing in the zero-th to the third channels.

Figure 31:
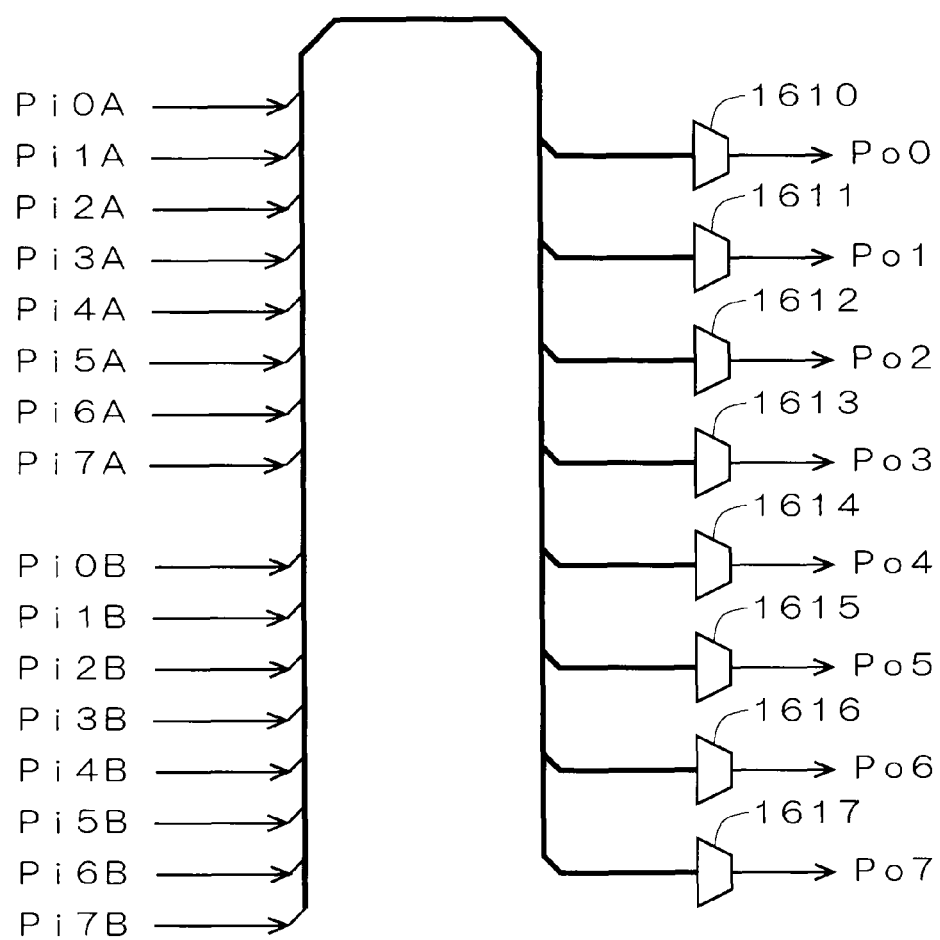
FIG. 31 is a circuit diagram illustrating a configuration of a processing block of an integration cell.

FIG. 31 is a circuit diagram illustrating a configuration of the processing block 41 of the integration cell Me. The integration cell Me includes 16 input terminals Pi0A to Pi7A and Pi0B to Pi7B equivalent of two domains, eight output terminals Po0 to Po7 equivalent of one domain, and selectors 1610 to 1617 corresponding to the output terminals Po0 to Po7. Each of the input terminals Pi0A to Pi7A and Pi0B to Pi7B includes an input channel selector not illustrated in FIG. 31 (see FIG. 5).

Each of the selectors 1610 to 1617 receives input of image data of 16 channels from the input terminals Pi0A to Pi7A and Pi0B to Pi7B. With the integration cell Me, selection of input terminals of each of the selectors 1610 to 1617 is set by the setting unit 14, so that image data of a desired channel is selected from image data of the 16 channels inputted by the input terminals Pi0A to Pi7A and Pi0B to Pi7B to each of the selectors 1610 to 1617, and the selected image data is outputted from the corresponding output terminals Po0 to Po7.

Figure 32:
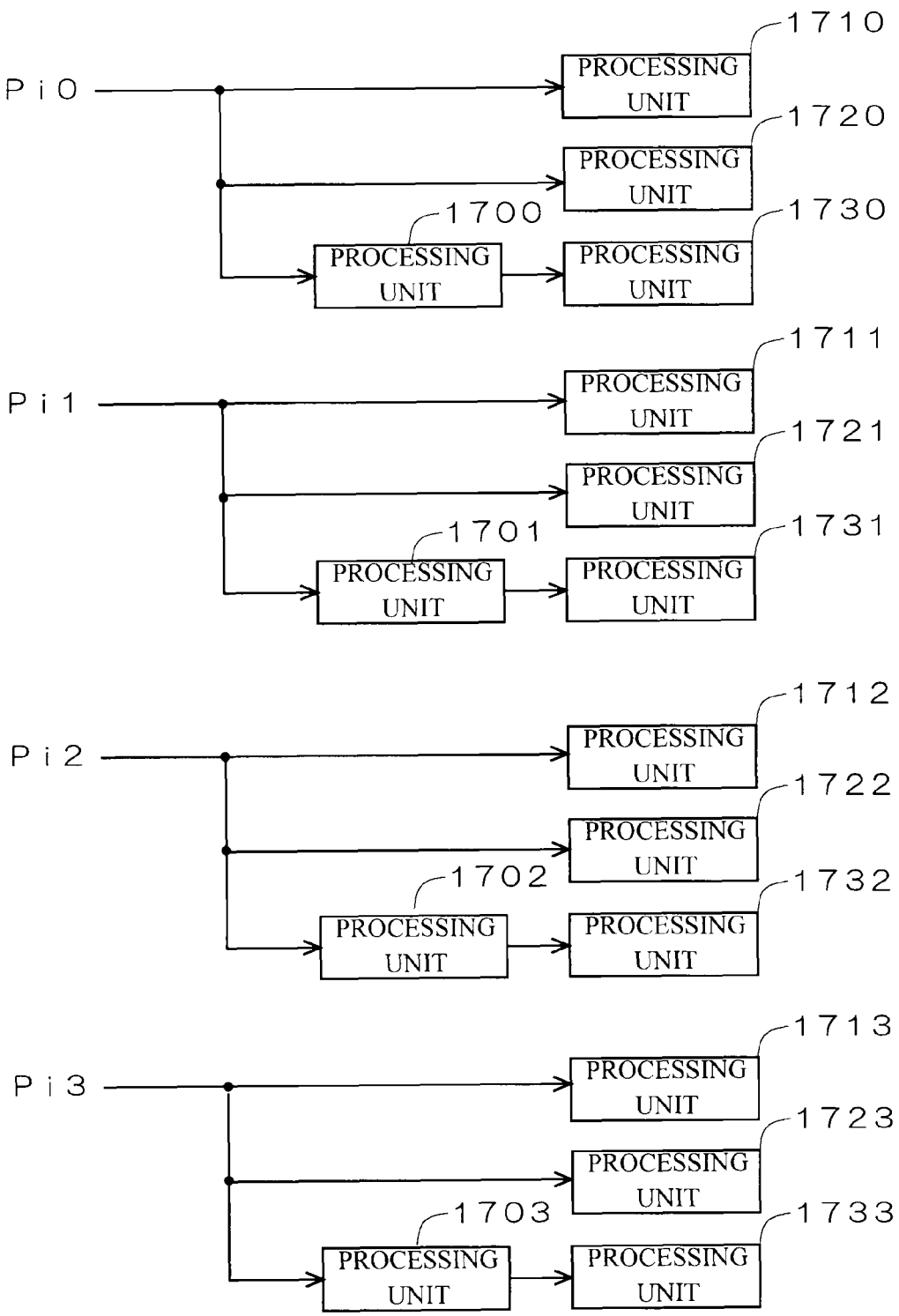
FIG. 32 is a circuit diagram illustrating a configuration of a processing block of an accumulator cell.

FIG. 32 is a circuit diagram illustrating a configuration of the processing block 41 of the accumulator cell Ac. The accumulator cell Ac includes four input terminals Pi0 to Pi3 and no output terminal to output image data. Each of the input terminals Pi0 to Pi3 includes an input channel selector not illustrated in FIG. 32 (see FIG. 5).

A zero-th channel includes processing units 1700, 1710, and 1720 connected to the input terminal Pi0. The processing unit 1700 is also connected to a processing unit 1730. The processing unit 1710 accumulates data values of image data received from the input terminal Pi0 within a range of an image set by the setting unit 14. The processing unit 1720 obtains a maximum value and a minimum value of the image data received from the input terminal Pi0 within a range of an image set by the setting unit 14. The processing unit 1700 performs predetermined clipping and noise reduction on the image data received from the input terminal Pi0. The processing unit 1730 accumulates data values of the image data received from the processing unit 1700 within a range of an image set by the setting unit 14.

Similarly, a first channel includes processing units 1701, 1711, and 1721 connected to the input terminal Pi1, and a processing unit 1731 connected to the processing unit 1701. A second channel includes processing units 1702, 1712, and 1722 connected to the input terminal Pi2, and a processing unit 1732 connected to the processing unit 1702. A third channel includes processing units 1703, 1713, and 1723 connected to the input terminal Pi3, and a processing unit 1733 connected to the processing unit 1703.

The processing units 1711 to 1713 accumulate data values of image data received from the input terminals Pi1 to Pi3 within a range of an image set by the setting unit 14, respectively. The processing units 1721 to 1723 obtain a maximum value and a minimum value of the image data received from the input terminals Pi1 to Pi3 within a range of an image set by the setting unit 14, respectively. The processing units 1701 to 1703 perform predetermined clipping and noise reduction on the image data received from the input terminals Pi1 to Pi3, respectively. The processing units 1731 to 1733 accumulate data values of the image data received from the processing units 1701 to 1703 within a range of an image set by the setting unit 14, respectively.

Figure 33:
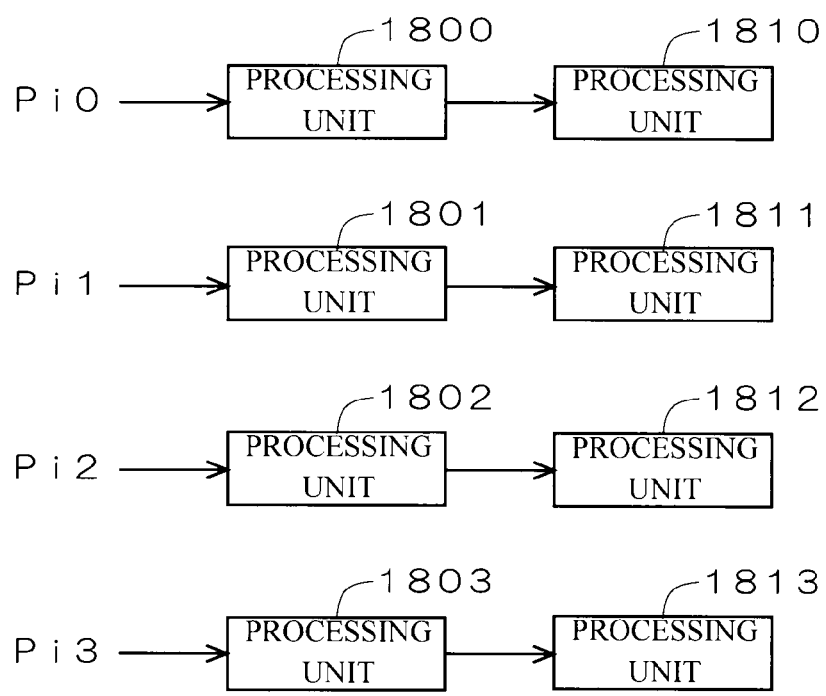
FIG. 33 is a circuit diagram illustrating a configuration of a processing block of a histogram cell.

FIG. 33 is a circuit diagram illustrating a configuration of the processing block 41 of the histogram cell Hi. The histogram cell Hi includes four input terminals Pi0 to Pi3 and no output terminal to output image data. Each of the input terminals Pi0 to Pi3 includes an input channel selector not illustrated in FIG. 33 (see FIG. 5).

A zero-th channel includes a processing unit 1800 connected to the input terminal Pi0, and a processing unit 1810 connected to the processing unit 1800. The processing unit 1800 shifts the image data received from the input terminal Pi0 by a predetermined bit number set by the setting unit 14. The processing unit 1810 creates a histogram with, for example, 256 steps of image data received from the processing unit 1800 within a range of an image set by the setting unit 14.

Similarly, a first channel includes a processing unit 1801 connected to the input terminal Pi1, and a processing unit 1811 connected to the processing unit 1801. A second channel includes a processing unit 1802 connected to the input terminal Pi2, and a processing unit 1812 connected to the processing unit 1802. A third channel includes a processing unit 1803 connected to the input terminal Pi3, and a processing unit 1813 connected to the processing unit 1803.

The processing units 1801 to 1803 shifts the image data received from the input terminals Pi1 to Pi3 by a predetermined bit number set by the setting unit 14, respectively. The processing units 1811 to 1813 create a histogram with, for example, 256 steps of image data received from the processing units 1801 to 1803 within a range of an image set by the setting unit 14, respectively.

Figure 34:
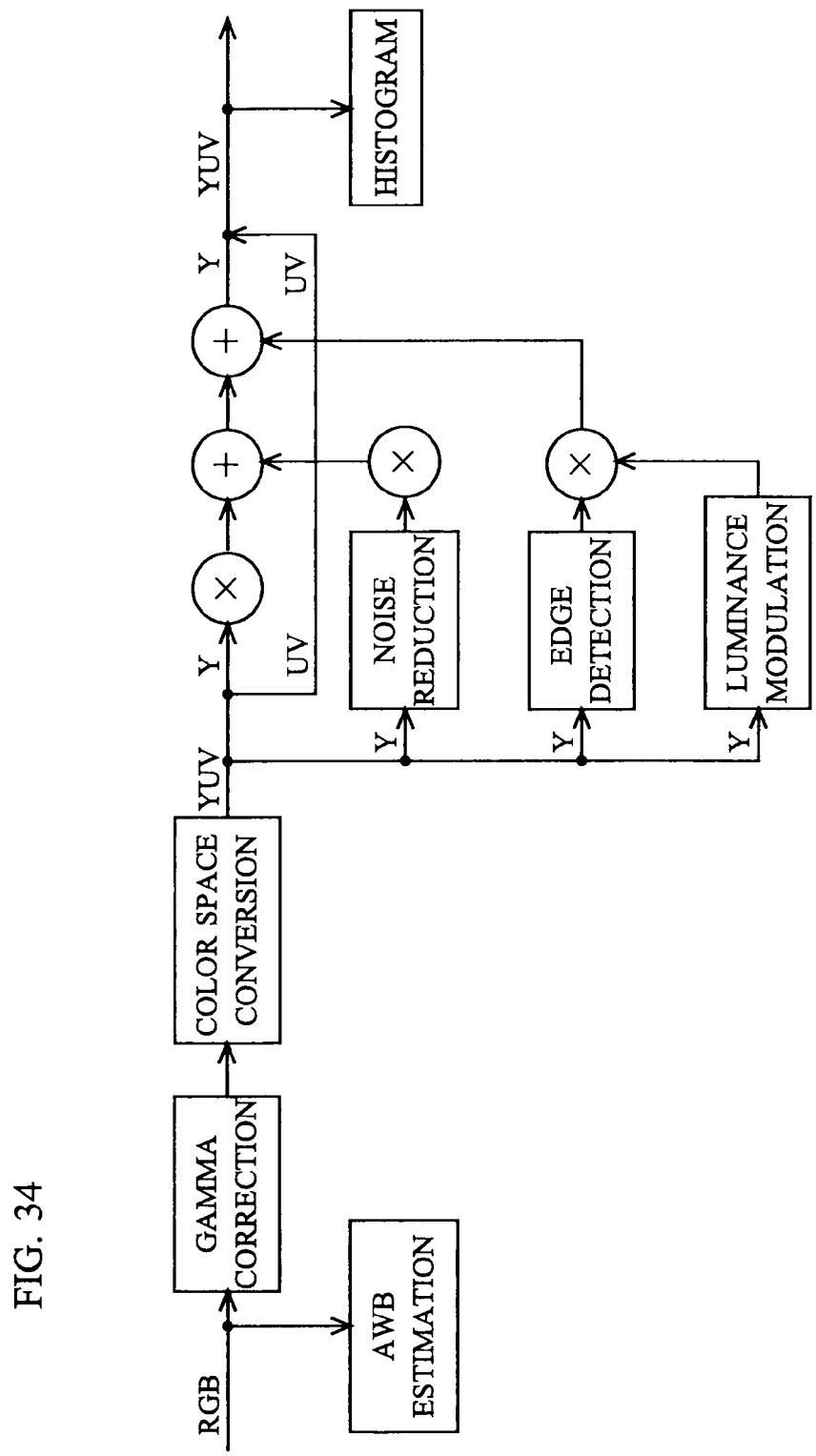
FIG. 34 illustrates a first example of image processing by the image processing unit.

FIG. 34 illustrates a first example of image processing by the image processing unit 3. In this example, gamma correction is first performed on image data of RGB color space. Next, conversion from RGB color space to YUV color space is performed. Then, noise reduction and edge enhancement are performed on luminance data Y of YUV color space. Moreover, AWB (Auto White Balance) estimation is performed on image data of RGB color space. Furthermore, a histogram is created for image data of YUV color space.

Figure 35:
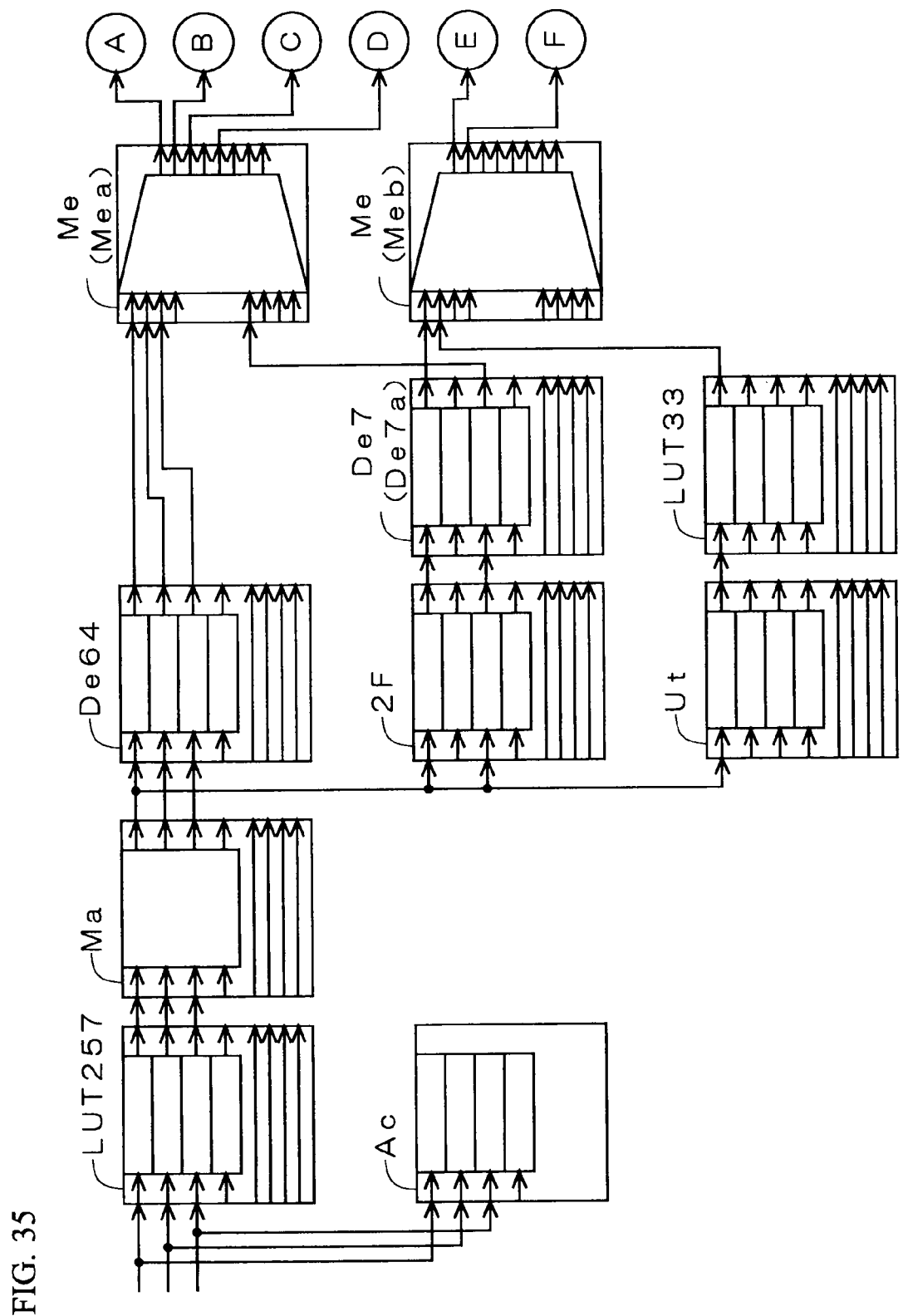
FIG. 35 is a circuit diagram illustrating an example of a configuration of the computing unit to realize image processing in FIG. 34.
Figure 36:
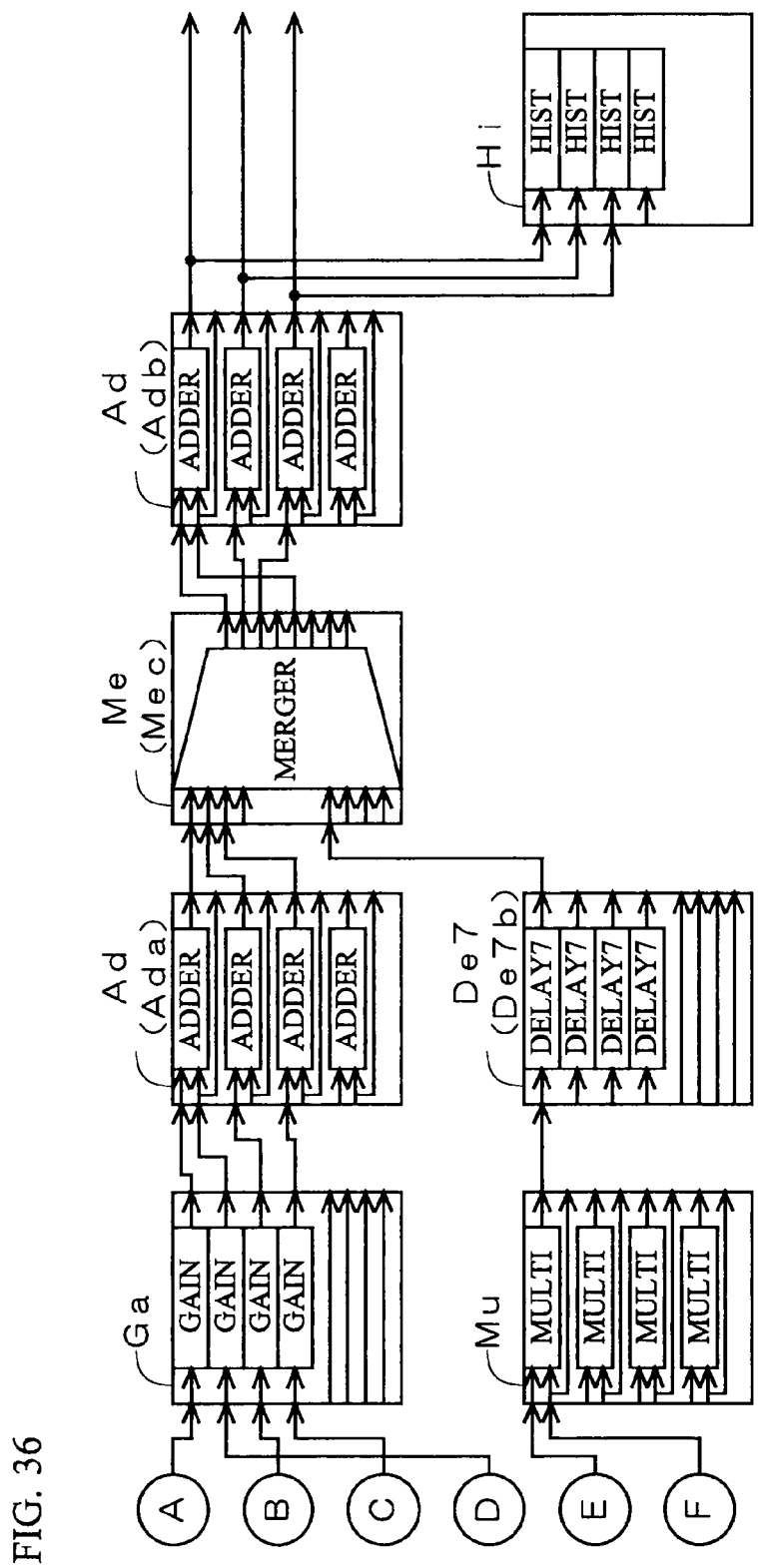
FIG. 36 is a circuit diagram illustrating the example of the configuration of the computing unit to realize image processing in FIG. 34.

FIGS. 35 and 36 are circuit diagrams illustrating an example of a configuration of the computing unit 13 to realize image processing in FIG. 34. In FIGS. 35 and 36, illustration of an input domain selector, an output domain selector, and an output channel selector is omitted to simplify the figures. The circuits illustrated in FIG. 35 and in FIG. 36 are connected to each other via the junctions A to F in the figures.

Referring to FIG. 35, the input terminals Pi0, Pi1, and Pi2 of the look-up table cell LUT257 respectively receive input of color data R, color data G, and color data B of RGB color space from the data input unit 10. The look-up table cell LUT257 performs gamma correction on the inputted image data of RGB color space.

The input terminals Pi0, Pi1, and Pi2 of the matrix computing cell Ma respectively receive input of color data R, color data G, and color data B of RGB color space from the look-up table cell LUT257. The matrix computing cell Ma converts the inputted image data of RGB color space into image data of YUV color space and outputs the data. Luminance data Y, chrominance data U, and chrominance data V of YUV color space are respectively outputted from the output terminals Po0, Po1, and Po2 of the matrix computing cell Ma.

The input terminals Pi0, Pi1, and Pi2 of the delay cell De64 respectively receive input of the luminance data Y, the chrominance data U, and the chrominance data V from the matrix computing cell Ma.

The input terminals Pi0 and Pi2 of the spatial filtering cell 2F each receive the luminance data Y from the matrix computing cell Ma. The spatial filtering cell 2F applies a highpass filter on the luminance data Y inputted to the input terminal Pi0 for edge detection and output the data. Moreover, the spatial filtering cell 2F applies a lowpass filter on the luminance data Y inputted to the input terminal Pi2 for noise reduction and outputs the data.

The input terminal Pi0 of the delay cell De7 (referred to as "delay cell De7a" to distinguish from another delay cell De7) connected to a subsequent stage of the spatial filtering cell 2F receives input of the luminance data Y on which the highpass filter has been applied by the spatial filtering cell 2F from the output terminal Po0 of the spatial filtering cell 2F. The input terminal Pi2 of the delay cell De7a receives input of the luminance data Y on which the lowpass filter has been applied by the spatial filtering cell 2F from the output terminal Po2 of the spatial filtering cell 2F.

The input terminal Pi0 of the multifunction cell Ut receives input of the luminance data Y from the matrix computing cell Ma. The multifunction cell Ut performs bit-shifts on the inputted luminance data Y for range correction of the data and outputs the data.

The input terminal Pi0 of the look-up table cell LUT33 receives input of the luminance data Y from the multifunction cell Ut. The look-up table cell LUT33 performs luminance modulation on the inputted luminance data Y and outputs the data.

The input terminals Pi0A, Pi1A, and Pi2A of the integration cell Me (referred to as "integration cell Mea" to distinguish from another integration cell Me) connected to a subsequent stage of the delay cell De64 respectively receive input of the luminance data Y, the chrominance data U, and the chrominance data V from the delay cell De64. The input terminal Pi0B of the integration cell Mea receives the luminance data Y from the output terminal Po2 of the delay cell De7a. The output terminals Po0, Po1, Po2, and Po4 of the integration cell Mea respectively output the luminance data Y inputted to the input terminal Pi0A of the integration cell Mea, the chrominance data U inputted to the input terminal Pi1A of the integration cell Mea, the chrominance data V inputted to the input terminal Pi2A of the integration cell Mea, and the luminance data Y inputted to the input terminal Pi0B of the integration cell Mea.

The input terminal Pi0A of the integration cell Me (referred to as "integration cell Meb" to distinguish from another integration cell Me) connected to a subsequent stage of the look-up table cell LUT33 receives input of the luminance data Y from the output terminal Po0 of the delay cell De7a. The input terminal Pi1A of the integration cell Meb receives input of the luminance data Y from the output terminal Po0 of the look-up table cell LUT33. The output terminals Po0 and Po1 of the integration cell Meb respectively output luminance data Y inputted to the input terminal Pi0A of the integration cell Meb and the luminance data Y inputted to the input terminal Pi1A of the integration cell Meb.

Referring to FIG. 36, the input terminals Pi0, Pi1, Pi2, and Pi3 of the gain cell Ga respectively receive input of the luminance data Y from the output terminal Po0 of the integration cell Mea, the luminance data Y from the output terminal Po4 of the integration cell Mea, the chrominance data U from the output terminal Po1 of the integration cell Mea, and the chrominance data V from the output terminal Po2 of the integration cell Mea.

The input terminals Pi0, Pi1, Pi2, and Pi4 of the addition cell Ad (referred to as "addition cell Ada" to distinguish from another addition cell Ad) connected to a subsequent stage of the gain cell Ga respectively receive input of the luminance data Y from the output terminal Po0 of the gain cell Ga, the luminance data Y from the output terminal Po1 of the gain cell Ga, the chrominance data U from the output terminal Po2 of the gain cell Ga, and the chrominance data V from the output terminal Po3 of the gain cell Ga. The addition cell Ada adds the luminance data Y from the output terminal Po0 of the gain cell Ga and the luminance data Y from the output terminal Po1 of the gain cell Ga to each other.

The input terminals Pi0 and Pi1 of the multiplication cell Mu respectively receive input of the luminance data Y from the output terminal Po0 of the integration cell Meb and the luminance data Y from the output terminal Po1 of the integration cell Meb. The multiplication cell Mu multiplies these luminance data Y by each other.

The input terminal Pi0 of the delay cell De7 (referred to as "delay cell De7b" to distinguish from another delay cell De7) connected to a subsequent stage of the multiplication cell Mu receives input of the luminance data Y from the output terminal Po0 of the multiplication cell Mu.

The input terminals Pi0A, Pi1A, and Pi2A of the integration cell Me (referred to as "integration cell Mec" to distinguish from another integration cell Me) connected to a subsequent stage of the addition cell Ada respectively receive input of the luminance data Y, the chrominance data U, and the chrominance data V from the addition cell Ada. The input terminal Pi0B of the integration cell Mec receives input of the luminance data Y from the output terminal Po0 of the delay cell De7b. The output terminals Po0, Po1, Po2, and Po4 of the integration cell Mec respectively output the luminance data Y inputted to the input terminal Pi0A of the integration cell Mec, the chrominance data U inputted to the input terminal Pi1A of the integration cell Mec, chrominance data V inputted to the input terminal Pi2A of the integration cell Mec, and the luminance data Y inputted to the input terminal Pi0B of the integration cell Mec.

The input terminals Pi0, Pi1, Pi2, and Pi4 of the addition cell Ad (referred to as "addition cell Adb" to distinguish from another addition cell Ad) connected to a subsequent stage of the integration cell Mec respectively receive input of the luminance data Y from the output terminal Po0 of the integration cell Mec, the luminance data Y from the output terminal Po4 of the integration cell Mec, the chrominance data U from the output terminal Po1 of the integration cell Mec, and the chrominance data V from the output terminal Po2 of the integration cell Mec. The addition cell Adb adds the luminance data Y from the output terminal Po0 of the integration cell Mec and the luminance data Y from the output terminal Po4 of the integration cell Mec to each other. The output terminals Po0, Po2, and Po4 of the addition cell Adb respectively output the luminance data Y, the chrominance data U, and the chrominance data V.

Referring to FIG. 35, the accumulator cell Ac receives input of the color data R, the color data G, and the color data B of RGB color space from the data input unit 10. Referring to FIG. 36, the histogram cell Hi receives input of the luminance data Y, the chrominance data U, and the chrominance data V of YUV color space from the addition cell Adb.

Figure 37:
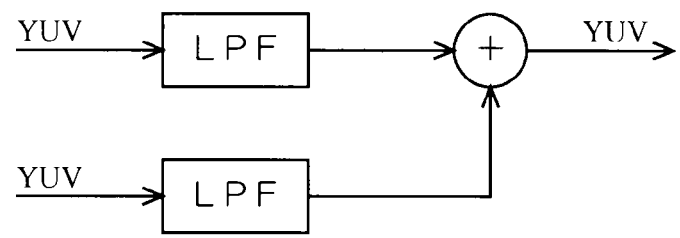
FIG. 37 illustrates a second example of image processing by the image processing unit.

FIG. 37 illustrates a second example of image processing by the image processing unit 3. In this example, noise reduction is performed on the chrominance data U and V of a first image data of YUV color space, and on the chrominance data U and V of a second image data of YUV color space, and then the first and the second image data are synthesized.

Figure 38:
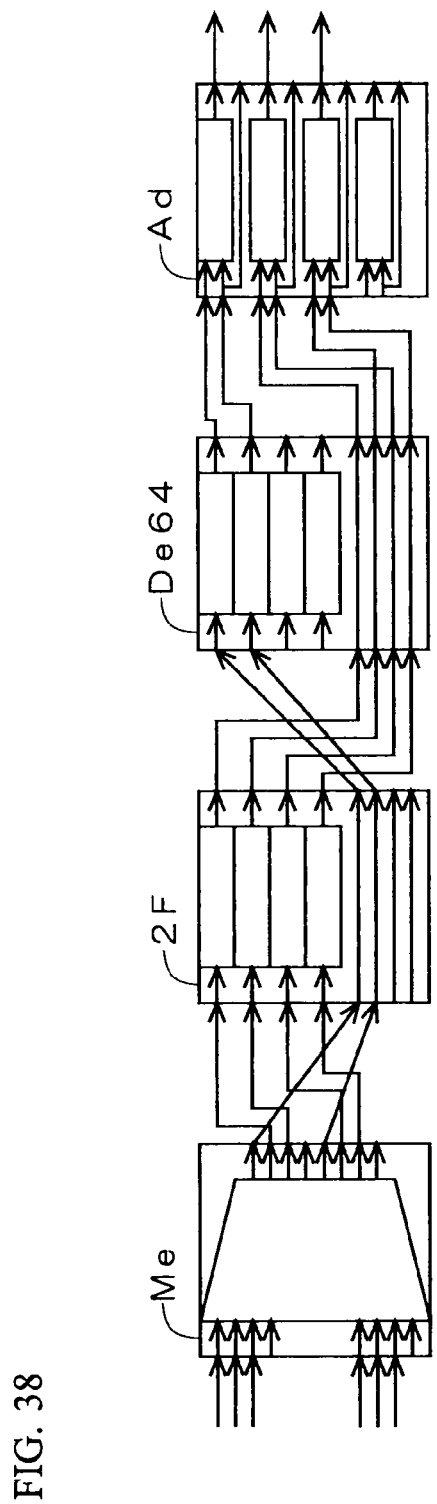
FIG. 38 is a circuit diagram illustrating an example of a configuration of the computing unit to realize image processing in FIG. 37.

FIG. 38 is a circuit diagram illustrating an example of a configuration of the computing unit 13 to realize image processing in FIG. 37. In FIG. 38, illustration of an input domain selector, an output domain selector, and an output channel selector is omitted to simplify the figures.

The input terminals Pi0A, Pi1A, and Pi2A of the integration cell Me respectively receive input of luminance data Y of a first image data, chrominance data U of the first image data, and chrominance data V of the first image data. The input terminals Pi0B, Pi1B, and Pi2B of the integration cell Me respectively receive input of luminance data Y of a second image data, chrominance data U of the second image data, and chrominance data V of the second image data. The output terminals Po0, Po1, and Po2 of the integration cell Me respectively output the luminance data Y inputted to the input terminal Pi0A of the integration cell Me, the chrominance data U inputted to the input terminal Pi1A of the integration cell Me, and the chrominance data V inputted to the input terminal Pi2A of the integration cell Me. The output terminals Po4, Po5, and Po6 of the integration cell Me respectively output the luminance data Y inputted to the input terminal Pi0B of the integration cell Me, the chrominance data U inputted to the input terminal Pi1B of the integration cell Me, and the chrominance data V inputted to the input terminal Pi2B of the integration cell Me.

The input terminals Pi0 Pi1, Pi2, and Pi3 of the spatial filtering cell 2F respectively receive the chrominance data U from the output terminal Po1 of the integration cell Me, the chrominance data V from the output terminal Po2 of the integration cell Me, the chrominance data U from the output terminal Po5 of the integration cell Me, and the chrominance data V from the output terminal Po6 of the integration cell Me. The spatial filtering cell 2F applies a lowpass filter on the data inputted to the input terminals Pi0 to Pi3 for noise reduction and outputs the data. The input terminals Pi4 and Pi5 of the spatial filtering cell 2F respectively receive input of the luminance data Y from the output terminal Po0 of the integration cell Me and the luminance data Y from the output terminal Po4 of the integration cell Me.

The input terminals Pi0 and Pi1 of the delay cell De64 respectively receive the luminance data Y from the output terminal Po4 of the spatial filtering cell 2F and the luminance data Y from the output terminal Po5 of the spatial filtering cell 2F. The input terminals Pi4, Pi5, Pi6, and Pi7 of the delay cell De64 respectively receive the chrominance data U from the output terminal Po0 of the spatial filtering cell 2F, the chrominance data V from the output terminal Po1 of the spatial filtering cell 2F, the chrominance data U from the output terminal Po2 of the spatial filtering cell 2F, and the chrominance data V from the output terminal Po3 of the spatial filtering cell 2F.

The input terminals Pi0, Pi1, Pi2, Pi3, Pi4, and Pi5 of the addition cell Ad respectively receive the luminance data Y from the output terminal Po0 of the delay cell De64, the luminance data Y from the output terminal Po1 of the delay cell De64, the chrominance data U from the output terminal Po4 of the delay cell De64, the chrominance data U from the output terminal Po6 of the delay cell De64, the chrominance data V from the output terminal Po5 of the delay cell De64, and the chrominance data V from the output terminal Po7 of the delay cell De64.

The addition cell Ad adds the luminance data Y from the output terminal Po0 of the delay cell De64 and the luminance data Y from the output terminal Po1 of the delay cell De64 to each other. The addition cell Ad adds the chrominance data U from the output terminal Po4 of the delay cell De64 and the chrominance data U from the output terminal Po6 of the delay cell De64 to each other. The addition cell Ad adds the chrominance data V from the output terminal Po5 of the delay cell De64 and the chrominance data V from the output terminal Po7 of the delay cell De64 to each other.

The output terminal Po0, Po2, and Po4 of the addition cell Ad respectively output the luminance data Y, the chrominance data U, and the chrominance data V.

The computing unit 13 of the image processing unit 3 (image processor) according to the present embodiment includes, as illustrated in FIGS. 2 to 4, the computing cells 30 including multiple types of computing cells, the input domain selectors 31, and at least one of the output domain selector 321 to 324. Then the setting unit 14 sets the input domain selectors 31 and the output domain selectors 321 to 324, so that image data inputted by the data input unit 10 to the computing unit 13 on which desired computing has been performed by one or more desired computing cells among the computing cells 30 is outputted from the data output unit 11. Therefore, a circuit that realizes intended processing is configured by setting the input domain selectors 31 and the output domain selectors 321 to 324 in accordance with the intended processing, which achieves flexible setting of types and orders of processing of image data. Even when types and orders of processing are changed, one-pass processing is feasible as long as there are sufficient functions of the computing cells, and thus a loop between the image processing unit 3 and the memory unit 4 is avoidable. This prevents increase in the time required. When one-pass processing is not possible, the intended processing can be still realized by loops, and also in such a case, the number of loops is reduced significantly, and thus increase in the time required is prevented.

Each computing cell 30 of the image processing unit 3 according to the present embodiment includes, as illustrated in FIG. 5, the input terminals Pi0 to Pi7 and the input channel selectors 400 to 407. The setting unit 14 sets the input channel selectors 400 to 407, so that image data of a desired channel is selected from image data of multiple channels inputted by the input domain selector 31 to each of the input channel selectors 400 to 407, and the selected image data is inputted to the respective input terminals Pi0 to Pi7. Such a configuration that allows the input channel selectors 400 to 407 to select a channel achieves flexible setting of types and orders of processing of image data.

The computing unit 13 of the image processing unit 3 according to the present embodiment includes, as illustrated in FIG. 3, at least one of the output channel selectors 331 to 334. The setting unit 14 sets the output channel selectors 331 to 334, so that image data of a desired channel is selected from image data of multiple channels inputted by the output domain selectors 321 to 324 to the output channel selectors 331 to 334, and the selected image data is inputted to the data output unit 11. Such a configuration that allows the output channel selectors 331 to 334 to select a channel achieves flexible setting of types and orders of processing of image data.

The computing cells 30 of the image processing unit 3 according to the present embodiment include, as illustrated in FIG. 31, the integration cell Me that integrates image data outputted from at least two computing cells 30. Having such integration cell Me within the computing unit 13 achieves flexible setting of types and orders of processing of image data.

The computing cells 30 of the image processing unit 3 according to the present embodiment include, as illustrated in FIGS. 14 to 18, the delay cells De64, De7, and De3 that allow a delay amount to be set. Having such delay cells De64, De7, and De3 that allow a delay amount to be set within the computing unit 13 achieves flexible setting of types and orders of processing of image data.

The computing cells 30 of the image processing unit 3 according to the present embodiment include, as illustrated in FIGS. 14 to 18, the delay cells De64, De7, and De3 that differ in delay amounts. Having such delay cells De64, De7, and De3 that differ in delay amounts within the computing unit 13 achieves flexible setting of types and orders of processing of image data.

The computing cells 30 of the image processing unit 3 according to the present embodiment include, as illustrated in FIGS. 19 to 24, the spatial filtering cell 2F that allows the number of taps to be set. Having such spatial filtering cell 2F that allows the number of taps to be set within the computing unit 13 achieves flexible setting of types and orders of processing of image data.

In the image processing unit 3 according to the present embodiment, as illustrated in FIGS. 19 to 24, the spatial filtering cell 2F is used independently as the spatial filters 1200B, 1200C, 1202B, and 1202C, when the number of taps of the spatial filtering cell 2F is set at 3×3. This achieves effective use of the spatial filtering cell 2F, and also achieves flexible setting of types and orders of processing of image data.

The spatial filtering cell 2F of the image processing unit 3 according to the present embodiment includes, as illustrated in FIGS. 19 to 24, the spatial filters 1200A and 1200B that allow a coefficient to be set and the spatial filters 1200C and 1202A to 1202C with a fixed coefficient. Having the spatial filters 1200A and 1200B that allow a coefficient to be set achieves flexible setting of types and orders of processing of image data. Having the spatial filters 1200C and 1202A to 1202C with a fixed coefficient avoids increase in circuit size compared with a case where all the spatial filters allow a coefficient to be set.

The computing cells 30 of the image processing unit 3 according to the present embodiment include, as illustrated in FIGS. 25 and 26, the matrix computing cell Ma that allows an order to be set. Having such matrix computing cell Ma that allows an order to be set within the computing unit 13 achieves flexible setting of types and orders of processing of image data.

The computing cells 30 of the image processing unit 3 according to the present embodiment include, as illustrated in FIGS. 8 and 9, the multifunction cell Ut that perform multiple types of computing. Having such multifunction cell Ut that performs multiple types of computing within the computing unit 13 achieves flexible setting of types and orders of processing of image data.

The computing cells 30 (gain cell Ga in the example of FIG. 6) of the image processing unit 3 according to the present embodiment may allow, referring to FIG. 6 for example, setting to perform desired computing on image data of the zero-th to the third channels for output, while outputting image data of the fourth to the seventh channels without performing desired computing. Having such paths where image data of the fourth to the seventh channels is outputted without computing achieves flexible setting of types and orders of processing of image data.

The computing cells 30 (gain cell GaD in the example of FIG. 7) of the image processing unit 3 according to the present embodiment may delay, referring to FIG. 7 for example, output of image data of the fourth to the seventh channels by a delay amount equivalent of time required for desired computing on image data of the zero-th to the third channels by the delay units 544 to 547. This enables the computing cell 30 to output image data of the zero-th to the third channels on which computing is performed and image data of the fourth to the seventh channel on which computing is not performed at the same time.

The computing cells 30 (gain cell Ga in the example of FIG. 6) of the image processing unit 3 according to the present embodiment may allow, referring to FIG. 6, for example, setting to output image data of the zero-th to the third channel without performing desired computing, by having the paths 530 to 533. Having such paths where image data of the zero-th to the third channels is outputted without computing achieves flexible setting of types and orders of processing of image data.

The computing unit 13 of the image processing unit 3 according to the present embodiment includes, as illustrated in FIG. 32, the accumulator cell Ac as one of the computing cells 30 that outputs no image data. Having such accumulator cell Ac within the computing unit 13 achieves flexible setting of types and orders of processing of image data.

The computing unit 13 of the image processing unit 3 according to the present embodiment includes, as illustrated in FIG. 33, the histogram cell Hi as one of the computing cells 30 that outputs no image data. Having such histogram cell Hi within the computing unit 13 achieves flexible setting of types and orders of processing of image data.

The data input unit 10 of the image processing unit 3 according to the present embodiment inputs, as illustrated in FIG. 2, the image data D1 received from the memory unit 4 to the computing unit 13. This enables the computing unit 13 to perform desired computing on the image data D1 received from the memory unit 4.

The data input unit 10 of the image processing unit 3 according to the present embodiment inputs, as illustrated in FIG. 2, the image data D2 received from the imaging element 2 to the computing unit 13. This enables the computing unit 13 to perform desired computing on the image data D2 received from the imaging element 2.

The data input unit 10 of the image processing unit 3 according to the present embodiment selects, as illustrated in FIG. 2, either one of the image data D1 received from the memory unit 4 and the image data D2 received from the imaging element 2 to input to the computing unit 13. This enables the computing unit 13 to perform desired computing on the image data D1 received from the memory unit 4 or the image data D2 received from the imaging element 2.

The data output unit 11 of the image processing unit 3 according to the present embodiment outputs, as illustrated in FIG. 2, the image data D3 computed by the computing unit 13 to the memory unit 4. This realizes storing of the image data D3 computed by the computing unit 13 in the memory unit 4.

The data output unit 11 of the image processing unit 3 according to the present embodiment outputs, as illustrated in FIG. 2, the image data D3 computed by the computing unit 13 to the display unit 5. This realizes displaying an image based on the image data D3 computed by the computing unit 13 with the display unit 5.

The data output unit 11 of the image processing unit 3 according to the present embodiment outputs, as illustrated in FIG. 2, the image data D3 computed by the computing unit 13 to the memory unit 4 and the display unit 5. This realizes storing of the image data D3 computed by the computing unit 13 in the memory unit 4 and also displaying an image based on the image data D3 computed by the computing unit 13 with the display unit 5.

While the invention has been described in detail, the foregoing description is in all aspects illustrative and not restrictive. It is understood that numerous other modifications and variations can be devised without departing from the scope of the invention.

What is claimed is:
1. An image processor comprising:
a computing unit that performs computing of image data, the image data including a plurality of channels;
a data input unit that inputs the image data to the computing unit; and
a data output unit that outputs image data that is computed by the computing unit,
the computing unit including:
a plurality of computing cells including a plurality of types of computing cells, each of the plurality of computing cells including a plurality of input terminals and a plurality of input channel selectors;
a plurality of input image data selectors;
an output image data selector; and
an output channel selector, wherein
an input of each of the plurality of input image data selectors is connected to an output of each of the plurality of computing cells and to an output of the data input unit,
an output of each of the plurality of input image data selectors is connected to an input of a respective one of the plurality of computing cells,
each of the plurality of input image data selectors is configured to:
receive image data from each of the plurality of computing cells and receive the image data from the data input unit,
select one of the input image data, and
output the selected image data to the respective one of the plurality of computing cells,
an input of the output image data selector is connected to the output of each of the computing cells, and the output image data selector is configured to:
receive image data that is output from each of the plurality of computing cells,
select a desired image data from the plurality of image data received from each of the plurality of computing cells, and
output the desired image data to the output channel selector,
an input of the output channel selector is connected to the output of the output image data selector, and an output of the output channel selector is connected to an input of the data output unit,
the output channel selector is configured to:
receive the desired image data from the output image data selector,
select a selected channel from the desired image data, and
output the selected channel to the data output unit, and
for each of the plurality of computing cells,
an input of each of the plurality of input channel selectors is connected to an output of a respective one of the plurality of input image data selectors,
an output of each of the plurality of input channel selectors is connected to a respective one of the plurality of input terminals,
the plurality of input channel selectors is configured to select a channel from image data input from the respective one of the plurality of input image data selectors, and
the channel selected by the plurality of input channel selectors is output to the respective one of the plurality of input terminals.

2. The image processor according to claim 1, wherein the plurality of computing cells includes an integration cell that integrates image data outputted from at least two of the plurality of computing cells.

3. The image processor according to claims 1, wherein the plurality of computing cells includes a delay cell that sets a delay amount.

4. The image processor according to claim 1, wherein the plurality of computing cells includes a plurality of delay cells that each set a different delay amount.

5. The image processor according to claim 1, wherein the plurality of computing cells includes a spatial filtering cell that sets a number of taps.

6. The image processor according to claim 5, wherein the number of taps of the spatial filtering cell is set at either one of a first value and a second value smaller than the first value, and
the spatial filtering cell is used independently as a plurality of spatial filters, when the number of taps of the spatial filtering cell is set at the second value.

7. The image processor according to claim 5, wherein the spatial filtering cell includes a spatial filter that sets a coefficient and a spatial filter with a fixed coefficient.

8. The image processor according to claim 1, wherein the plurality of computing cells includes a matrix computing cell that sets an order.

9. The image processor according to of claim 1, wherein the plurality of computing cells includes a multifunction cell that performs a plurality of types of computing.

10. The image processor according to claim 1, wherein at least one of the plurality of computing cells is configured to
receive input of the image data including the plurality of channels, and
perform a desired computing on the image data of a first channel while outputting image data of a second channel without the desired computing.

11. The image processor according to claim 10, wherein the at least one of the plurality of computing cells delays output of the image data of the second channel by a delay amount equivalent to a time required for the desired computing on the image data of the first channel.

12. The image processor according to claim 10, wherein the at least one of the plurality of computing cells outputs image data of the first channel without performing desired computing.

13. The image processor according to claim 1, wherein the computing unit further includes an accumulator cell as one of the plurality of computing cells that outputs no image data.

14. The image processor according to claim 1, wherein the computing unit further includes a histogram cell as one of the plurality of computing cells that outputs no image data.

15. The image processor according to claim 1, wherein the data input unit inputs image data received from a memory unit to the computing unit.

16. The image processor according to claim 1, wherein the data input unit inputs image data received from an imaging element to the computing unit.

17. The image processor according to claim 1, wherein the data input unit selects either one of image data received from a memory unit and image data received from an imaging element to input to the computing unit.

18. The image processor according to claim 1, wherein the data output unit outputs image data computed by the computing unit to a memory unit.

19. The image processor according to claim 1, wherein the data output unit outputs image data computed by the computing unit to a display unit.

20. The image processor according to claim 1, wherein the data output unit outputs image data computed by the computing unit to a memory unit and a display unit.

* * * * *